(12) United States Patent
Thompson

(10) Patent No.: US 11,238,760 B2
(45) Date of Patent: Feb. 1, 2022

(54) APPARATUS FOR SELECTIVELY DISPLAYING ASSOCIATIVE VEHICLE OPERATION SAFETY RELATED INDICIA REPEATEDLY VISUALLY PERCEPTIBLE TO A VEHICLE OPERATOR

(71) Applicant: Trampas Allen Thompson, Ojai, CA (US)

(72) Inventor: Trampas Allen Thompson, Ojai, CA (US)

(73) Assignee: Trampas Allen Thompson

(*) Notice: Subject to any disclaimer, the term of this patent is extended or adjusted under 35 U.S.C. 154(b) by 41 days.

(21) Appl. No.: 16/439,632

(22) Filed: Jun. 12, 2019

(65) Prior Publication Data
US 2020/0394940 A1   Dec. 17, 2020

Related U.S. Application Data

(60) Provisional application No. 62/682,809, filed on Jun. 8, 2018.

(51) Int. Cl.
| | |
|---|---|
| *G06F 7/10* | (2006.01) |
| *G09F 7/18* | (2006.01) |
| *G05B 9/02* | (2006.01) |
| *G09F 7/10* | (2006.01) |
| *G09F 13/18* | (2006.01) |

(52) U.S. Cl.
CPC ............. *G09F 7/10* (2013.01); *G05B 9/02* (2013.01); *G09F 13/18* (2013.01); *G09F 7/18* (2013.01); *G09F 2007/1843* (2013.01); *G09F 2007/1865* (2013.01); *G09F 2013/1845* (2013.01); *G09F 2013/1881* (2013.01)

(58) Field of Classification Search
CPC . G09F 7/00; G09F 7/18; G09F 13/044; G09F 21/049; G09F 13/18
See application file for complete search history.

(56) References Cited

U.S. PATENT DOCUMENTS

| | | | |
|---|---|---|---|
| 2,089,596 A * | 8/1937 | Buhr | ................. B60R 7/04 40/627 |
| 4,607,444 A | 8/1986 | Foster | |
| (Continued) | | | |

*Primary Examiner* — Albert K Wong

(57) ABSTRACT

Vehicle operation safety related indicia (VSRI) displaying apparatus(es) disclosed display, adjacent or proximate a vehicle surface at least generally vehicle operator facing, VSRI on a vehicle operator facing surface of a VSRI display member, slidably positionable between a VSRI non-revealed and a VSRI revealed state displaying VSRI extended outwardly from a side of the apparatus. VSRI subject-matter, optionally-illuminated and/or electro-mechanically positioned, depicts one or more objects extending outwardly from at least one side of a vehicle having an in-use VSRI display apparatus, or from a vehicle rack or towed device. VSRI display apparatus variants include a housing or body appearing and/or shaped like the vehicle, or side(s) thereof, having an in-use apparatus. Secondary indicia displaying surface-areas also provided, concurrently display additional VSRI and/or advertising, promotional or cross-promotional content associated with a maker, proprietor or service-provider of VSRI depicted subject matter, wherein all VSRI is repeatedly visually perceptible and viewable at-a-glance.

10 Claims, 9 Drawing Sheets

(56) References Cited

U.S. PATENT DOCUMENTS

| | | | | |
|---|---|---|---|---|
| 5,430,965 | A * | 7/1995 | Lai | G09F 7/18 |
| | | | | 40/358 |
| 5,479,735 | A * | 1/1996 | Martin, Jr. | G09F 21/049 |
| | | | | 40/593 |
| 6,690,268 | B2 | 2/2004 | Schofield | |
| 9,916,779 | B1 * | 3/2018 | Parnell | H02S 20/00 |
| 2011/0146119 | A1 * | 6/2011 | Wagner | G09F 9/30 |
| | | | | 40/452 |
| 2016/0325674 | A1 * | 11/2016 | Krull | B60Q 3/14 |
| 2017/0092161 | A1 * | 3/2017 | Anzalone | G09F 7/18 |
| 2018/0293920 | A1 * | 10/2018 | McCarthy | G09F 7/18 |
| 2019/0100159 | A1 * | 4/2019 | Schone | G09F 13/12 |
| 2019/0103041 | A1 * | 4/2019 | Bache | G09F 21/10 |
| 2019/0206289 | A1 * | 7/2019 | St. John | G09F 21/04 |

* cited by examiner

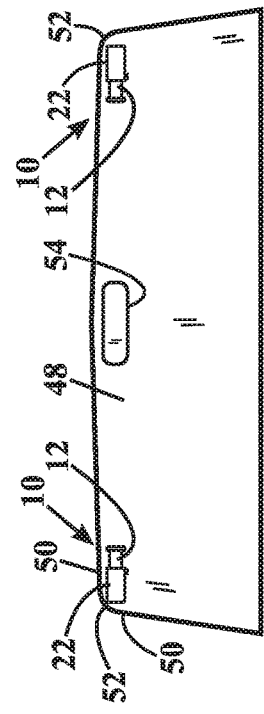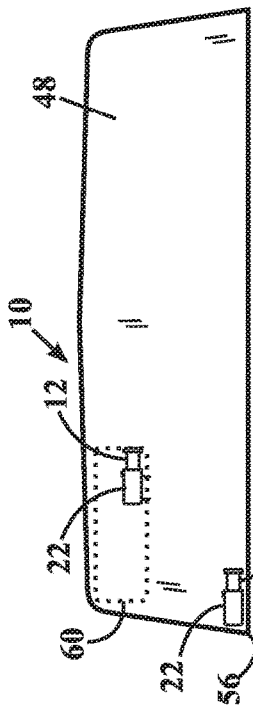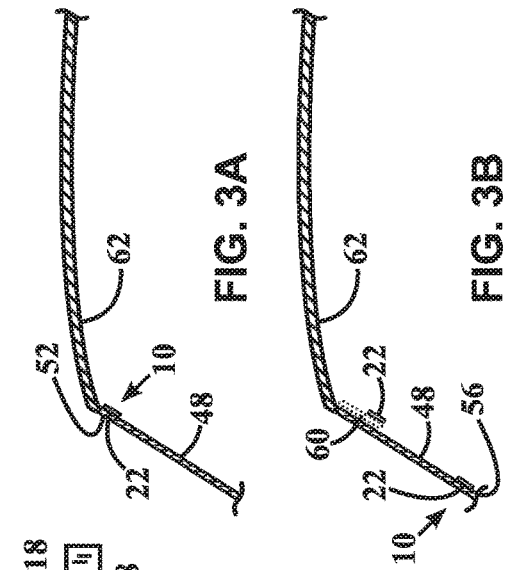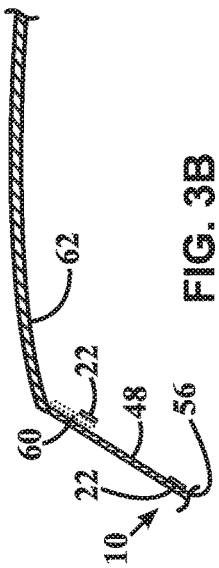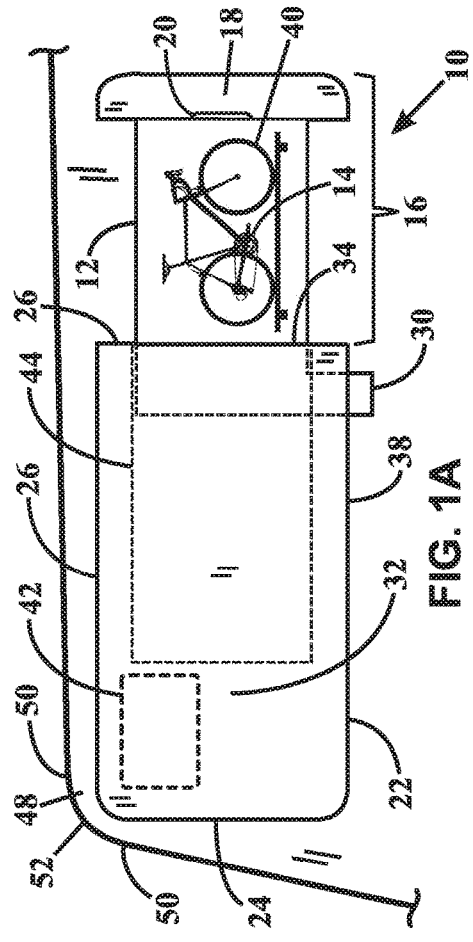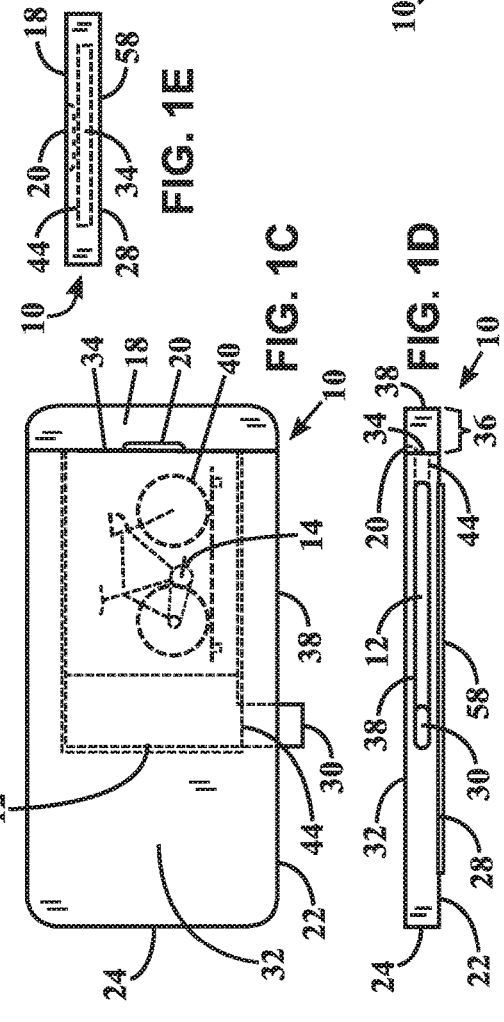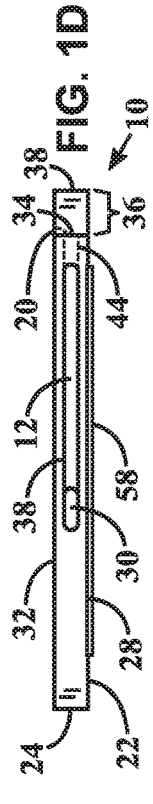

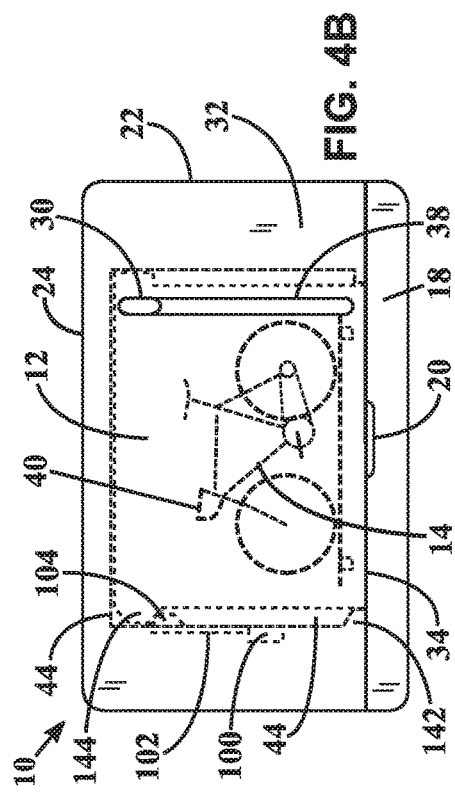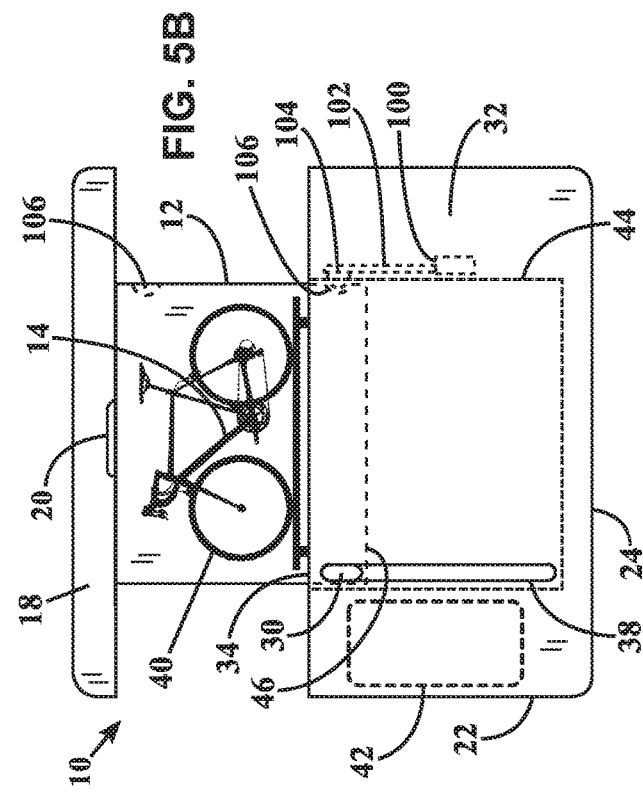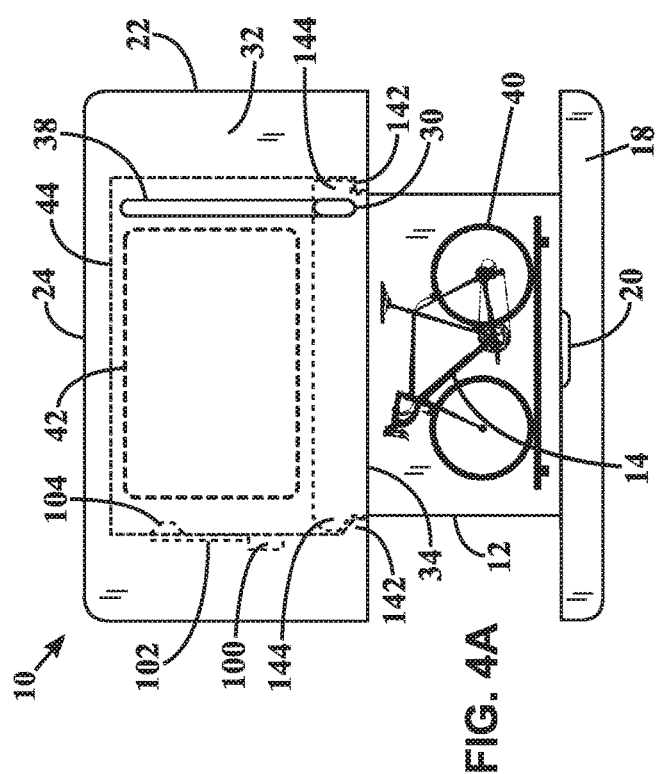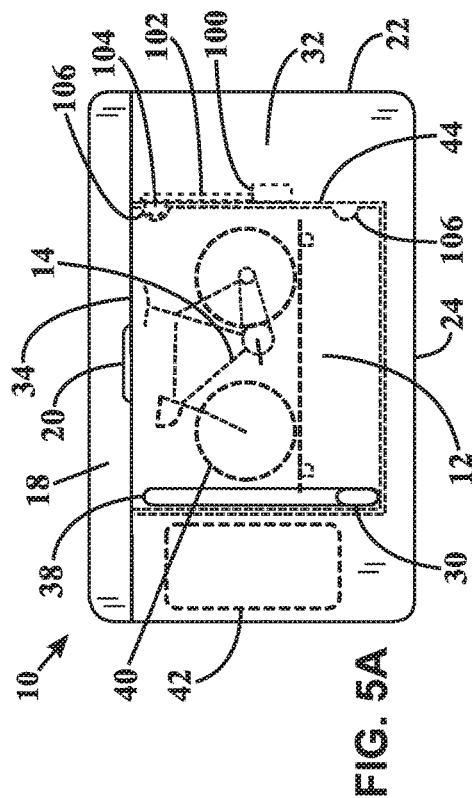

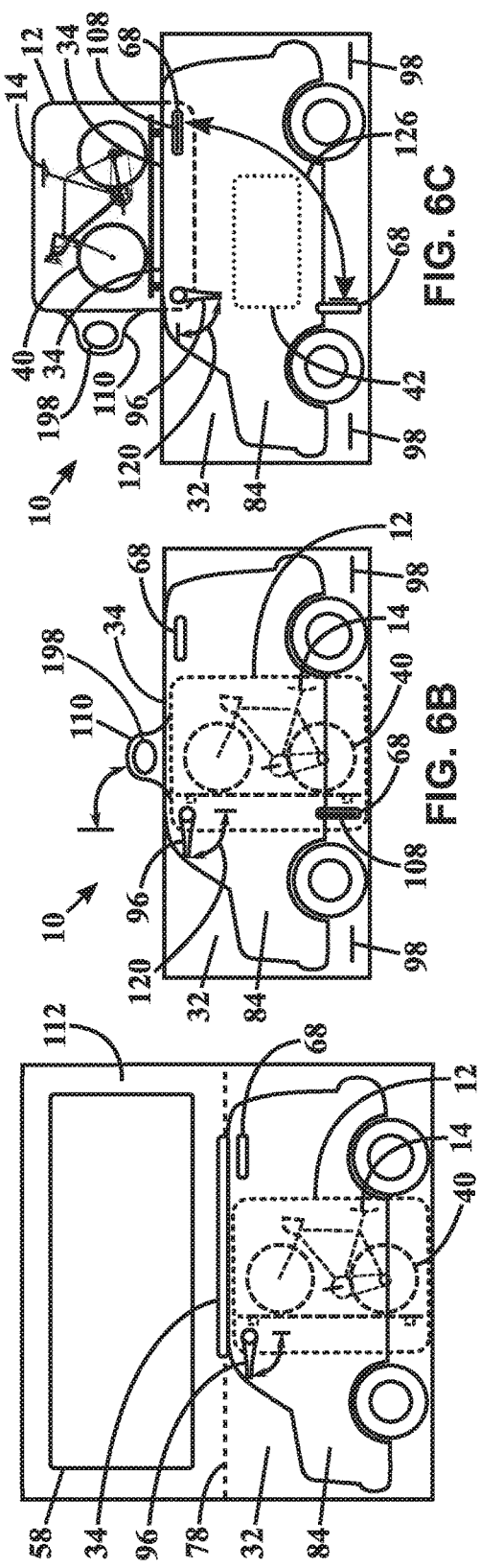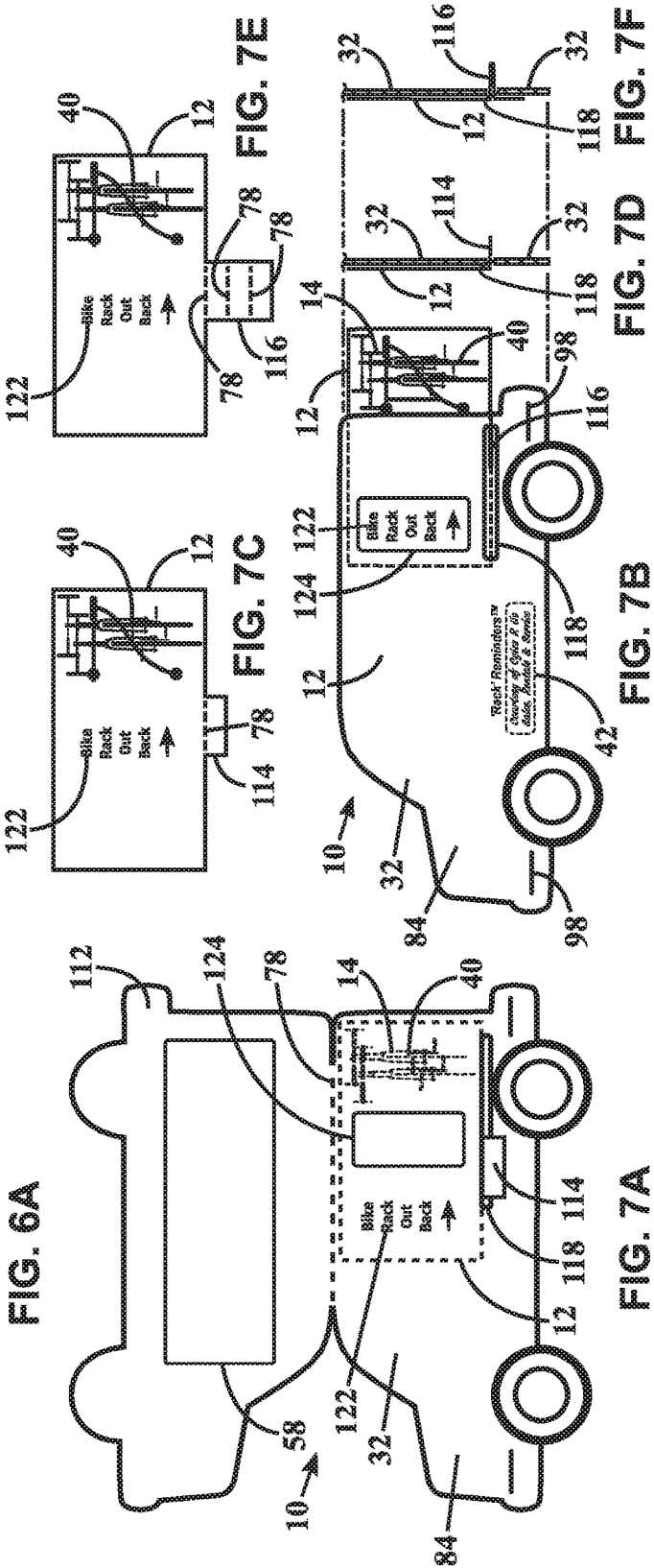

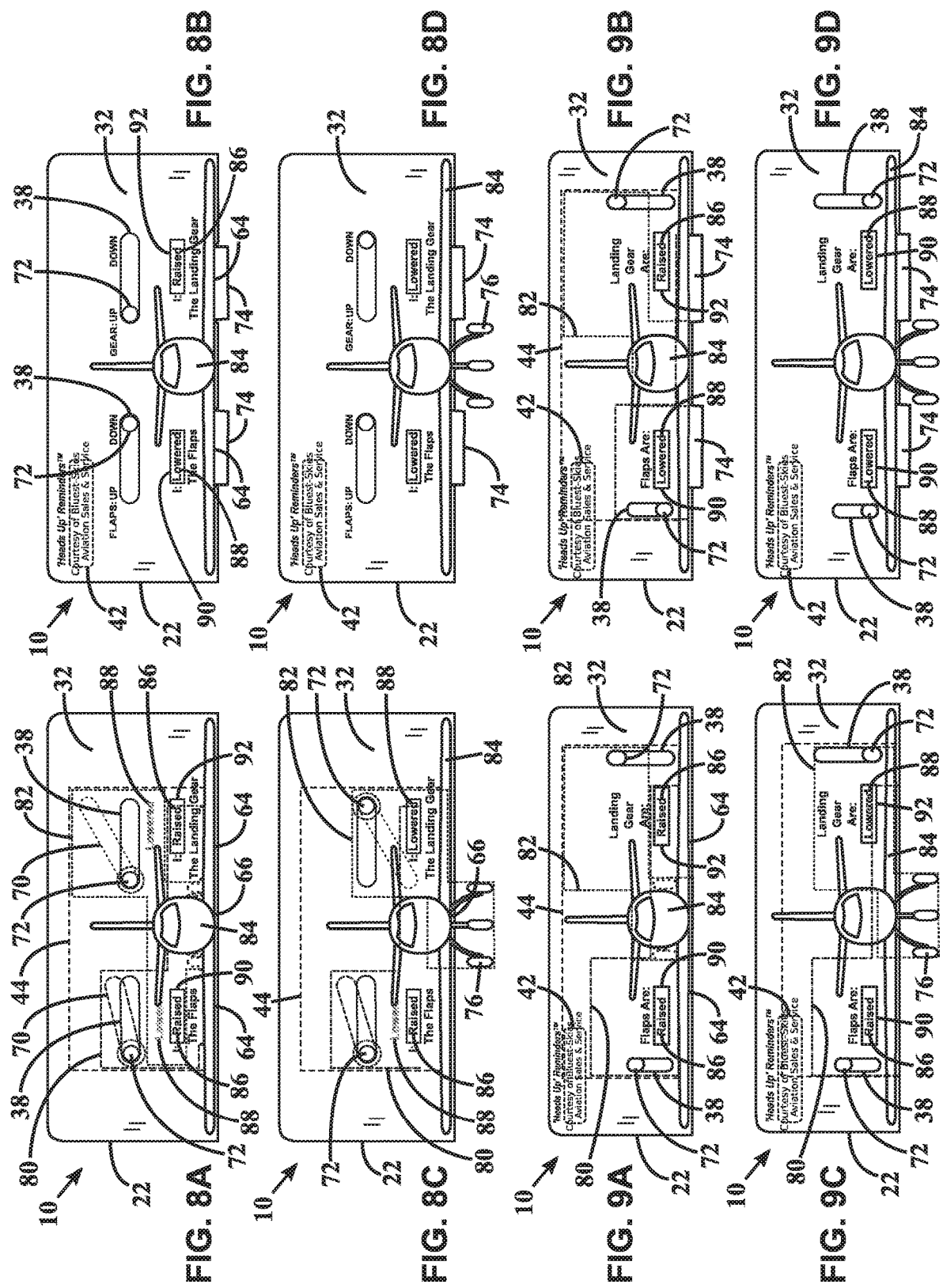

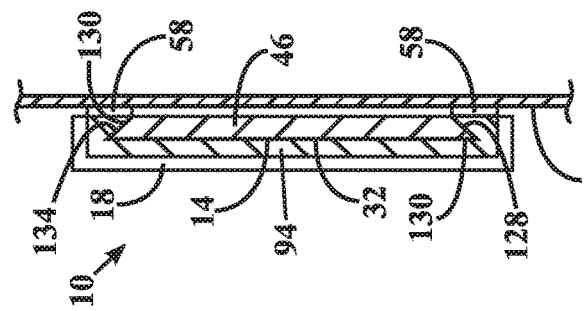
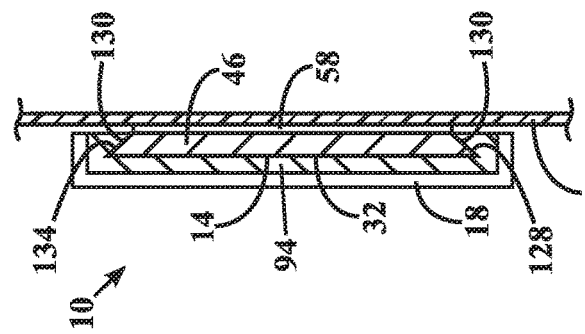
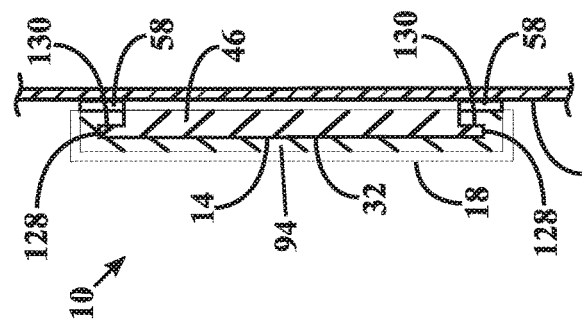
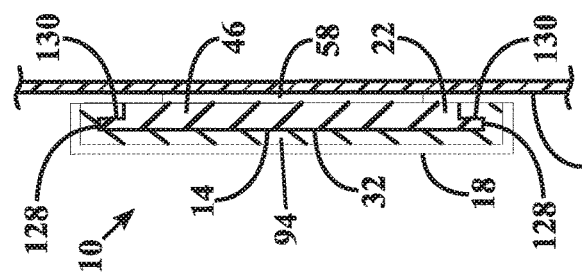
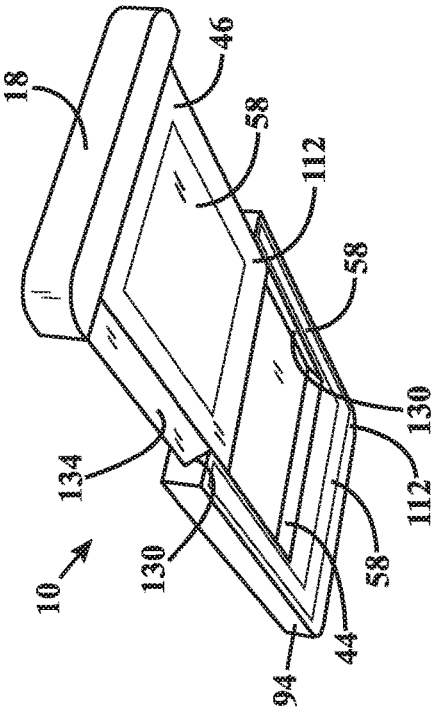

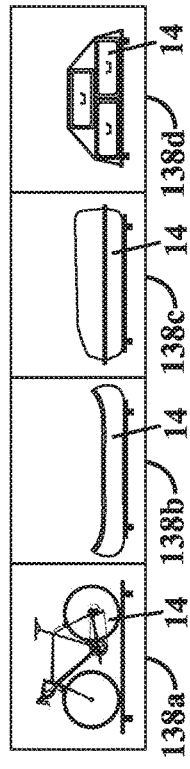
FIG. 12A
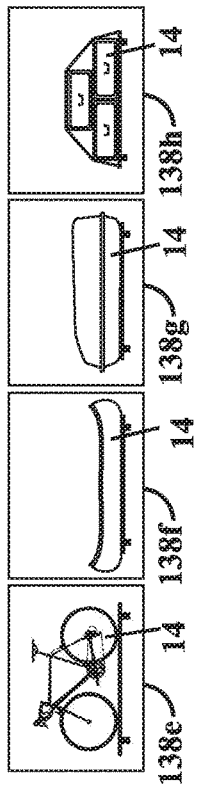
FIG. 12B
FIG. 12C
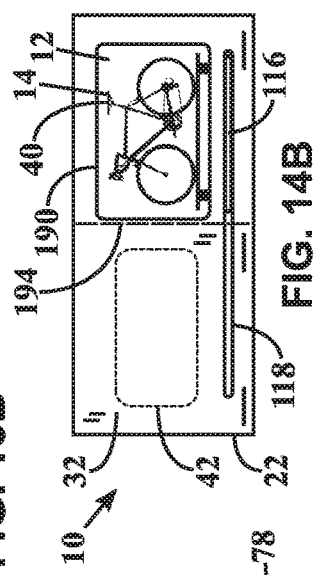
FIG. 13A
FIG. 13B
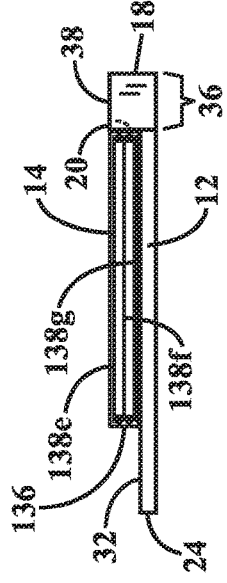
FIG. 14B
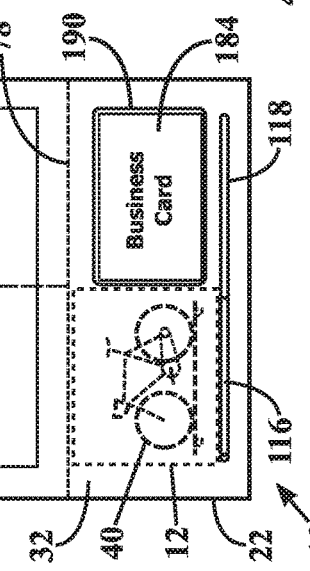
FIG. 14A
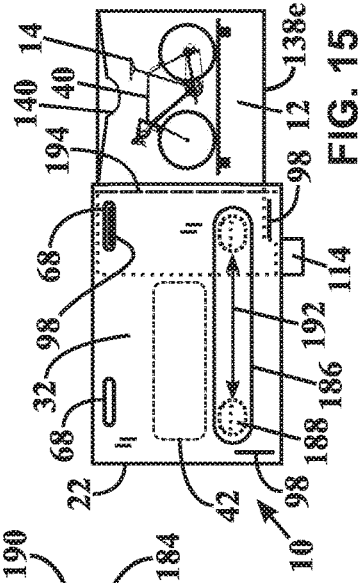
FIG. 15
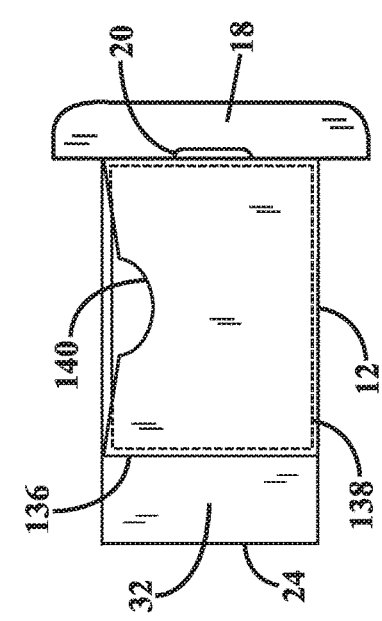

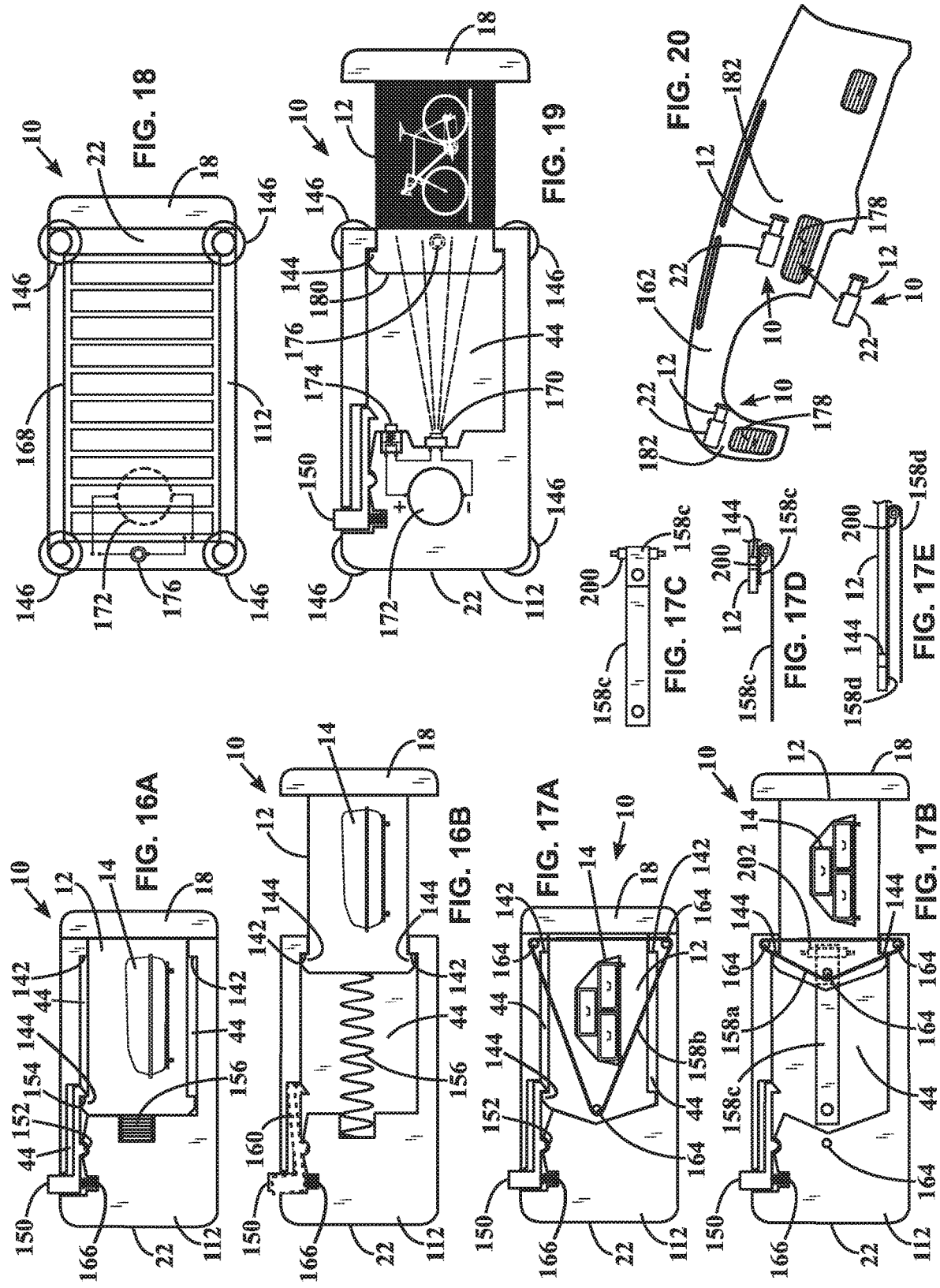

APPARATUS FOR SELECTIVELY DISPLAYING ASSOCIATIVE VEHICLE OPERATION SAFETY RELATED INDICIA REPEATEDLY VISUALLY PERCEPTIBLE TO A VEHICLE OPERATOR

PRIORITY CLAIM

This application is non-provisional application which claims priority to U.S. Provisional Patent Application Ser. No. 62/682,809 filed Jun. 8, 2018, the disclosure of which is hereby incorporated by reference as if fully set forth herein.

FIELD OF THE INVENTION

The present invention relates to the field of vehicle operation safety awareness-increasing apparatus(es), products, and methods of using such, and more particularly relates to employing any one or more of such to increase vehicle operation safety awareness of a vehicle operator when operating a vehicle while one or more objects, extending outwardly from at least one side of the vehicle are moved by, or along with, the vehicle. The invention further relates to apparatuses and methods for selectively displaying vehicle-operation safety-related indicia or content, located unobtrusively in a viewable-at-a-glance and visually non-impairing manner, on, adjacent or proximate a vehicle-operator facing surface, so as to be repeatedly visually perceptible to a vehicle operator, to enhance vehicle-operation safety awareness while the vehicle is operated, wherein the indicia or content is indicative of, and suitable to serve as a reminder to a vehicle operator, of one or more objects extending outwardly from at least one side of the vehicle operated by the vehicle operator.

BACKGROUND OF THE INVENTION

One or more of the problems addressed by the present invention occur when a vehicle is moving, conveying or transporting one or more objects extending outwardly from at least one side of the vehicle e.g., when attached or secured thereto, and the vehicle operator, for example a driver of an automobile, truck, SUV or RV forgets, or momentarily fails to keep in mind, that such objects extend beyond, or significantly beyond, the exterior surface and/or normal exterior size of the vehicle, and then directs the vehicle in a manner causing some, costly and/or irreparable damage to one or more of: the one or more moved or transported objects, other object(s) proximate the vehicle, the vehicle itself, or one or more bystanders. A common example of this, unfortunately occurring too often, is when a driver first secures one or more bicycles onto a bicycle rack fastened to a top side, or adjacent a rear-end side of a car, SUV or RV, and not having the bicycle(s) readily in view and/or in mind then directs the car. SUV or RV such that some (or a major) portion of the bicycle(s) collides with a fixed object proximate to the vehicle. For example, this can easily occur with the bicycle(s) secured to a rack above a car or SUV when the vehicle is driven into or out of one's garage, or into or out of a multilevel parking facility, or when driving under one or more other obstruction(s) that are too low, and not taking into account the added height of the bicycle(s) extending upwardly (or outwardly) from an exterior side of the car or SUV. Relatedly, a moving or transporting of one or more objects extending outwardly from at least one side of a vehicle may inadvertently get humped, become loosened or dislodged from a respective rack secured to a vehicle in a manner that goes unnoticed by the vehicle operator, causing the one or more objects to subsequently be damaged, cause damage or create a driving hazard or vehicle related injury. For example, by an object, or portion thereof, falling off or being dislodged from the vehicle.

In many instances, the number of vehicle operating errors and potentially costly consequences thereof could be significantly reduced or avoided by vehicle operators keeping better in mind the fact that one or more objects being moved or transported by a vehicle they are operating, are extending outwardly, or significantly so, from at least one side of that vehicle, and it is among the objects of the present invention to increase such an awareness. For example, by providing a compact, unobtrusively placed apparatus fastenable at a location viewable-at-a-glance to the vehicle-operator, and visually non-impairing to the vehicle-operator's view when normally operating the vehicle or when looking forward, wherein the apparatus preferably in reach of the vehicle operator displays indicia, selectively revealed by the operator, indicative of and reminding the operator of one or more objects extending outwardly from at least one side of the vehicle.

Of course, minor, costly and/or irreparable vehicle-operating error related damage and/or injury, is not limited to merely a moving or transporting of one or more bicycles mounted on a rack secured adjacent a side of a vehicle and extending upwardly or outwardly therefrom. For example, a moving or transporting of any of a variety of other one or more objects can also cause similar damage or injury, including but not limited to, any one or more of the following: surf boards, wave boards, skis, snow boards, canoes, kayaks, boats, water craft, pieces of luggage, storage receptacles, bins or boxes, racks, a towed trailer, a towed vehicle, a towed recreational vehicle, longitudinally extending objects or poles, and the like. Accordingly, it would advantageous to provide methods and apparatus variants operable for selectively displaying indicia indicative of and reminding a vehicle-operator of any one or more of the foregoing, as any one or more of such are moved or transported on a vehicle while extending upwardly and/or outwardly therefrom, and such that, the indicia viewable-at-a-glance to the vehicle-operator, serves as a pervasive and repeatedly perceptible vehicle operation safety related reminder, and it is among the objects of the present invention to provide such methods and apparatus embodiment variants.

BRIEF DESCRIPTION OF THE DRAWINGS FIGURES

To facilitate an ease of understanding of, and a coherence between, similar features and/or elements depicted in different ones of the drawing figures and/or preferred embodiments, a repeating of certain reference numerals has been provided. For the sake of brevity, the phrase "vehicle-operation safety related indicia" may otherwise be represented by the acronym 'VSRI'.

FIG. 1A is a two-dimensional view of a VSRI display apparatus of the present invention depicted mounted adjacent or proximate a corner of a vehicle windshield within a compact-sized area thereof, wherein a slidably positionable member of the apparatus is shown positioned such that vehicle safety-related indicia are facing a vehicle-operator in a manner viewable-at-a-glance and repeatedly visually perceptible to the vehicle operator.

FIG. 1B is a two-dimensional side view depiction of the VSRI display apparatus of FIG. 1A. In FIGS. 1A and 1B a bracket indicates an open state of the slidably positionable member range of movement.

FIG. 1C is a two-dimensional depiction of the apparatus illustrated in FIG. 1A wherein the slidably positionable VSRI display member of the apparatus is shown positioned such that vehicle operation safety-related indicia of the member is concealed from view.

Figure 21:
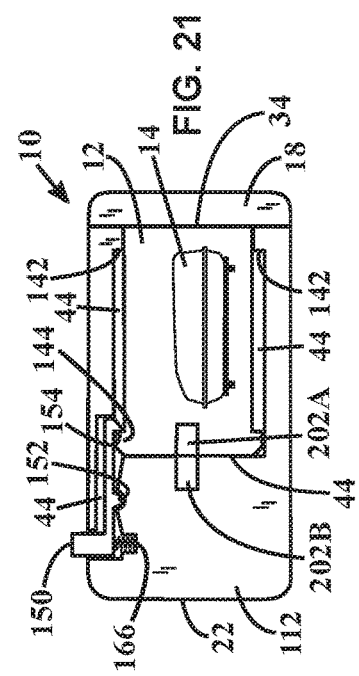

FIG. 1D is a two-dimensional side view depiction of the apparatus embodiment illustrated in FIG. 1C. FIG. 1E is a two-dimensional end view depiction of the apparatus embodiment illustrated in FIG. 1C. FIGS. 2A and 2B are each a two-dimensional depiction of a VSRI display apparatus illustrating options for unobtrusively mounting or releasably fastening a given apparatus in a visually non-impairing manner to a principally vehicle-operator facing surface of a vehicle windshield in FIG. 2A or in FIG. 2B a sun-visor.

FIGS. 3A and 3B respectively are each a two-dimensional, partial cross-sectional side view depicting a forward portion of a vehicle roof adjoining an upper side of a vehicle windshield, wherein a VSRI display apparatus 10 is releasably fastened adjacent a windshield location similar to those of an upper windshield corner in FIG. 2A, and a lower windshield corner in FIG. 2B.

FIGS. 4A through 5B are each a two-dimensional depiction of a VSRI display apparatus similar to the VSRI display apparatus 10 depicted in FIGS. 1A and 1C, wherein in FIGS. 4A and 4B a VSRI display member is adapted to be selectively slidably positionable upwardly and downwardly adjacent a lower longer side of a display apparatus housing (or body), and in FIGS. 5A and 5B a VSRI display member is selectively, slidably positionable upwardly and downwardly adjacent an upper longer side of a display apparatus housing.

FIGS. 6A through 6C are each a two-dimensional depiction of a VSRI display apparatus comprising, on a foldable planar and polygonal shaped material or sheet material, a likeness of a vehicle of a type in which the apparatus is intended to be mounted or releasably attached, wherein a slidably positionable VSRI display member is operable to be selectively positioned between concealed and revealed states by a rotating or pivoting of the member.

FIGS. 7A and 7B are each a two-dimensional depiction of a VSRI display apparatus comprising a planar foldable planar material or sheet material, adapted to depict a likeness of a vehicle type, and/or shape thereof, in which the apparatus is intended to mounted or releasably attached, wherein a slidably positionable VSRI display member thereof is operable to be selectively positioned so as to appear extending outwardly from a side of the depicted vehicle, such that VSRI thereon associatively represents one or more actual objects of a type extending outwardly from a corresponding or same side of the actual vehicle about to be, or currently being, operated a vehicle operator. FIGS. 7A-7C and 7E further depict a secondary vehicle operation safety related indicia slidably positionable into alignment with an indicia viewing window as the VSRI is concurrently revealed.

FIGS. 7C through 7F each depict a two-dimensional VSRI display member having a tab portion adapted to extend outwardly from and be slidably positionable along a longitudinal axis and within a span of an elongate aperture. In FIGS. 7A, 7B and 7D (the latter depicting a side-end view of a FIG. 7C tab) a single fold/single layer tab portion of a VSRI display member is folded as depicted in FIG. 7A or 7D to extend outwardly from an elongate aperture. FIGS. 7E and 7F depict an option to include a VSRI display member folded or layered tab slidably operable in an elongate slot, e.g., a tab foldable at perforation or score lines in a manner depicted in the cross-sectional side view of FIG. 7F, for a selective slidable positioning of a respective VSRI display member.

FIGS. 8A-8D and 9A-9D are each a two-dimensional depiction of a VSRI display apparatus comprising a plurality of slidably positionable members and preferably a plurality of secondary indicia viewing windows for selectively indicating in each a first indicated status indicia or a second indicated status indicia. Each of the figures further depicts a front side of a respective VSRI apparatus which includes a likeness of a vehicle type in which the apparatus is intended to be mounted or releasably attached preferably in reach of an operator of the vehicle.

FIGS. 10A and 10B and FIGS. 11A and 11A are each a cross-sectional two-dimensional depiction of a VSRI display apparatus, wherein in each of FIG. 10A and FIG. 11A a first apparatus member rear-surface portion is adapted to be mounted to, or releasably fastenable to, a vehicle windshield, dashboard or control panel in a stationary manner such that an adjacent second apparatus member is manually positionable in a slidable manner in relation to the first member. In each of FIG. 10B and FIG. 11B a converse arrangement is depicted, wherein a second apparatus member rear-surface portion is adapted to be mounted to or releasably fastenable to a vehicle windshield, dashboard or control panel in a stationary manner such that a first apparatus member is manually positionable in relation to the second member.

FIGS. 10C and 11C are each three-dimensional depictions of 10A-10B and 11A-11B respectively, wherein each of FIGS. 10A-10C and 11A-11C depict a first apparatus member having on each of opposite outer sides an elongate tongue slidably operable within a corresponding one of opposing inward-facing grooves or channels of a second apparatus member. In FIG. 10C each elongate tongue and corresponding channel has a cross-section comprised of 90° cuts. In FIG. 11C each elongate tongue and corresponding channel has a cross-section comprised of angled or mitered cuts.

FIGS. 12A-12C are each a two-dimensional depiction of a VSRI display apparatus positionable member, wherein a planar surface area of a side of the member e.g., normally vehicle-operator facing, comprises a receptacle, pocket or envelope having an opening or passageway suitable for a receiving and removal of each of one or more VSRI cards, sheets or tiles. FIGS. 12A, 12B and 12C respectively are a vehicle operator facing side view, a side view and a distal-end view depiction.

FIGS. 13A and 13B are each a two-dimensional depiction of one of a plurality of different VSRI cards, sheets or tiles, each comprising one or more objects viewable through a transparent or translucent side of the receptacle, pocket or envelope of 12A-12C. FIG. 13A depicts an elongate foldable planar or sheet material comprising on at least one of its sides, different types of the VSRI one or more objects. FIG. 13B depicts four separate cards, sheets or tiles, each having on at least one of its sides a different type VSRI one or more objects individually insertable into and removable from a display member receptacle, pocket or envelope.

FIGS. 14A and 14B are each a two-dimensional depiction of a VSRI display apparatus comprising a foldable planar or sheet material, wherein a slidably positionable member intermediate folded portions of the material, is operable to be selectively positioned such that VSRI thereon appears within an indicia content display window, and optionally reveals a business name or business card in the window when the positionable member is slid to a concealed state. FIGS. 14A and 14B further depict options to fold a full-width rear-side portion, or a half-width rear-side portion, aligned with a front-side as layered folded and attached portions of a VSRI display apparatus.

FIG. 15 is a two-dimensional depiction of a reduced-width folded VSRI display apparatus comprising prior to being folded, a taller-than-wide (not depicted) foldable planar or sheet material, wherein in FIG. 15 a folded over upper portion of the material, is securable by one or more fasteners adjacent and overlapping a lower portion of the material, sufficient to enclose a VSRI display member in a slidably positionable manner intermediate the two portions.

FIGS. 16A-16B and 17A-17B are each a two-dimensional somewhat diagrammatical depiction of an interior of a VSRI display apparatus wherein each of the embodiments comprise a push-button release mechanism operable to actuate a compressed-element release (as in FIGS. 16A-16B), or a tensioned-element release (as in FIGS. 17A-17E) each sufficient to slidably position a respective VSRI display member to a fully-revealed indicia state.

FIG. 18 is a two-dimensional somewhat diagrammatical depiction of a rear-side of a VSRI display apparatus comprising, integrally formed thereon, affixed or releasably fastened thereto, a solar panel in operative communication with a circuit and a supply of electricity e.g., one or more rechargeable batteries the combination adapted so as to cause a charging of the battery(s). Optionally the apparatus includes a light sensing element communicably coupled with the circuit.

FIG. 19 is a two-dimensional somewhat diagrammatical depiction of an interior of a display apparatus housing (or body) 22 or a rear-side thereof, and preferably including one or more components of the embodiment depicted in FIG. 18, wherein FIG. 19 further includes one or more electrically illuminated elements (e.g., LEDs) communicably coupled with a circuit located to illuminate VSRI of a VSRI display member.

FIG. 20 is a three-dimensional depiction of a vehicle operator-facing portion of a dashboard, control or instrument panel of a vehicle, comprising, a plurality of generally or principally vehicle-operator facing portions (e.g., readily within reach of a vehicle operator), onto or proximate which a VSRI display apparatus can be mounted, or releasably attached.

FIG. 21 is a two-dimensional somewhat diagrammatical depiction of an interior of a VSRI display apparatus comprising two magnets with like poles aligned adjacent one another each of sufficient magnetic force such that upon a push-button release of a VSRI display member the display member is slidably positioned to an indicia fully revealed state.

Figure 22B:
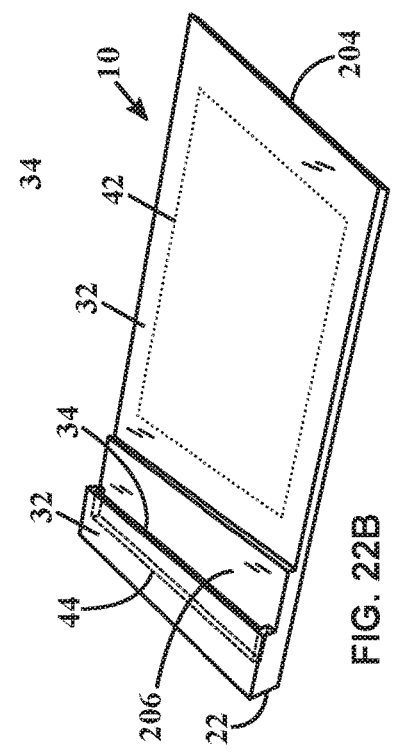
Figure 22D:
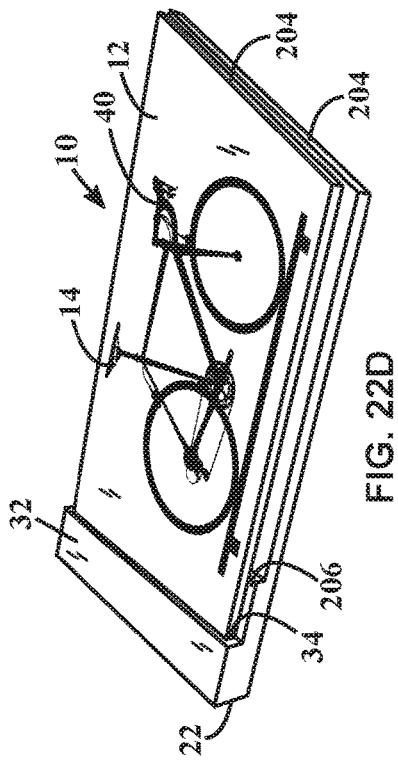
Figure 22A:
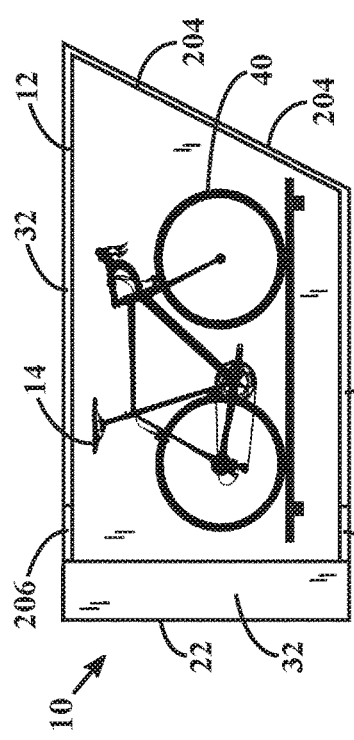
Figure 22C:
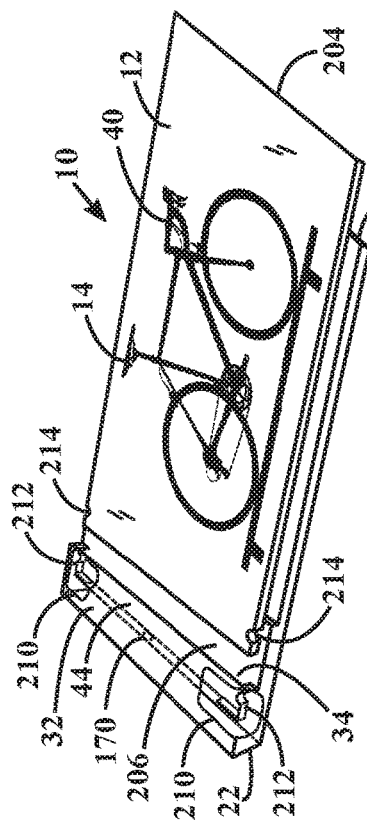
Figure 22E:
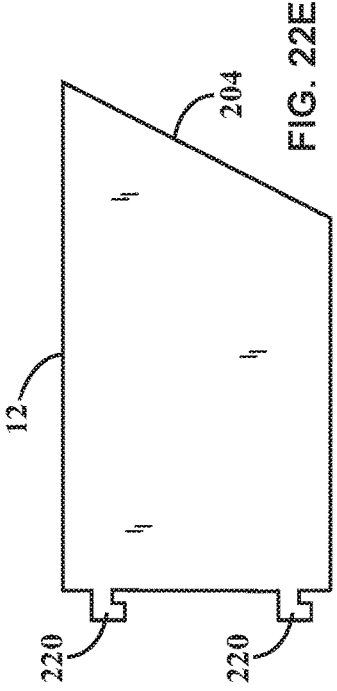

FIGS. 22A through 22E depict a VSRI apparatus embodiment having a display member end portion adapted to be slid into and releasably attached within a reduced-width cavity of an apparatus housing such that VSRI is fully displayed exteriorly adjacent the cavity. FIGS. 22A and 22E are two-dimensional views respectively, of a VSRI display apparatus embodiment in FIG. 22A, and a VSRI display member thereof in FIG. 22E. FIGS. 22B through 22D are a series of three-dimensional views wherein, in FIG. 22B indicia of a VSRI display member is yet to be displayed, in FIG. 22C a VSRI member end is proximate to and aligned to be slid through a housing passageway into a cavity, and in FIG. 22D the VSRI display member is attached with indicia fully displayed. FIGS. 22A through 22E further depict an option to include on at least one apparatus housing side and/or VSRI member side, a non-square angled side.

Figure 23A:
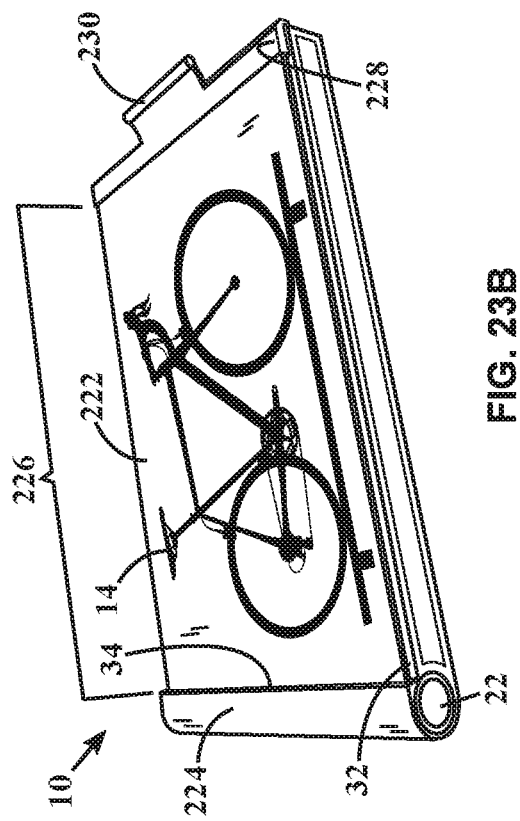
Figure 23B:
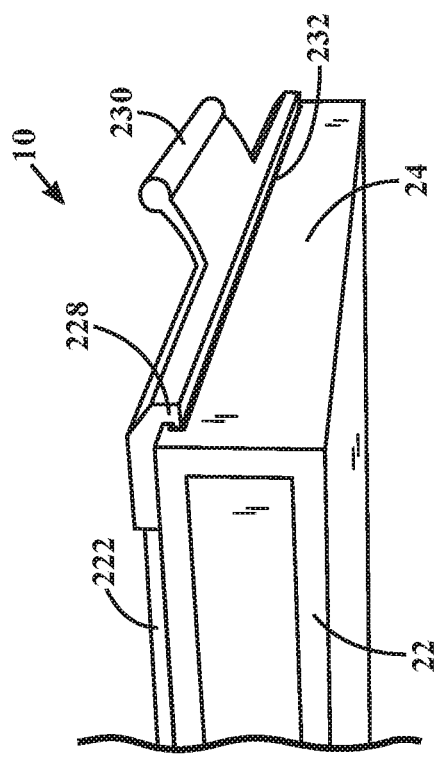

FIGS. 23A and 23B are each a perspective view of a VSRI display apparatus comprising a flexible VSRI display member, which in FIG. 23A is depicted fully retracted within a housing of the apparatus, and in FIG. 23B is depicted having been slid by a manual positioning of a handle attached to a distal end of the flexible display member, to extend outwardly over an entire bracket-indicated adjustment range.

Figure 23C:
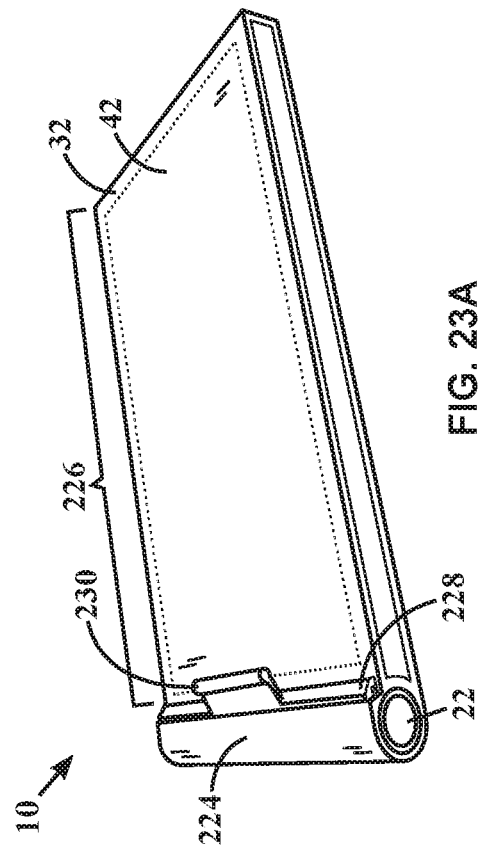
Figure 23D:
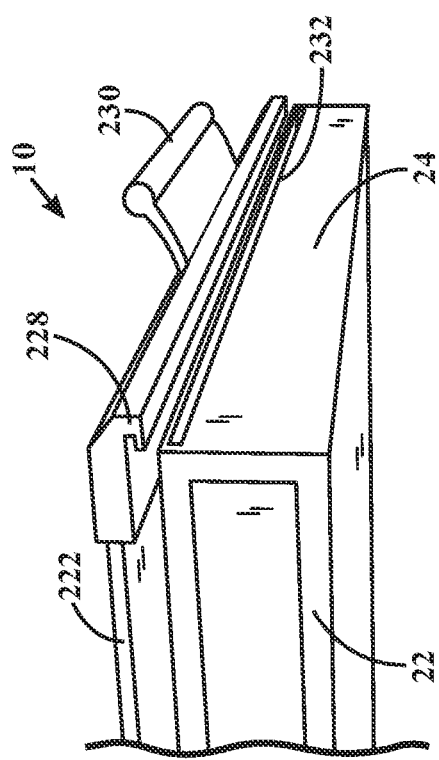

FIGS. 23C and 23D are each a partial perspective view depiction of a distal end of the VSRI display apparatus embodiment depicted in FIGS. 23A and 23B, wherein in FIG. 23C a distal end of an apparatus housing includes an elongate slot for engagement of elongate hooked portion of a flexible VSRI display member fastener, and in FIG. 23D the elongate hooked portion of a flexible VSRI display member fastener in depicted engaged within the elongate slot.

TERMS USED IN THE SPECIFICATION

"Vehicle-Operation Safety-Related Indicia"

The term "vehicle-operation safety-related indicia" and acronym thereof 'VSRI' as used in the specification refer to subject matter, preferably discernible-at-a-glance and located so as to be repeatedly visually perceptible to a vehicle operator, which is associative of, representative of, or a depiction of one or more objects transported by or moved along with a vehicle operated by vehicle operator and extending outwardly from at least one side of the vehicle.

"Compact"

The term "compact" as used in the specification, including, but not limited to "compact-sized" or "compact-in-size", with respect to a size-range of preferred ones of the VSRI display apparatus embodiments and/or an area at, adjacent or proximate which a VSRI display apparatus is mounted or releasably attached, is somewhat relative, depending on the size of the vehicle in which a VSRI apparatus is in use, and/or the size or type of surface on which the apparatus is installed. For example, when a VSRI display apparatus is installed onto an interior, or generally vehicle-operator facing surface of a windshield in an average-sized automobile or SUV, a preferable 'compact' size-range, would be from about the size of a business card or a packaged deck of playing cards to about that of a personal checkbook, taking into account that the apparatus is sized and shaped so as to not be visually impairing to a vehicle operator normally operating the vehicle. When the apparatus is installed onto generally vehicle-operator facing surface of a dashboard, instrument or control panel (or vent-slat thereof) in a common and/or average sized automobile or SUV, a preferable 'compact' size-range, can be somewhat larger. In vehicles with considerably larger windshields and/or dashboards, or instrument panels e.g., those of ships, larger boats, recreational vehicles, large construction or transportation vehicles, and the like, a preferable 'compact' size-range, can be 'scaled-up' e.g., proportionally, relative to such considerably increased size vehicles.

The advantages of the invention will be set forth, in part, in the description below, and in part will be apparent from the description, or may be learned by practice of the invention. The advantages of the invention may be realized and obtained by the combinations set forth herein.

DETAILED DESCRIPTION OF THE PREFERRED EMBODIMENTS

With respect to FIGS. 1A through 1E, each is a two-dimensional side-view of one of the preferred embodiments of a VSRI display apparatus 10 of the present invention. FIGS. 1A and 1C respectively depict a vehicle-operator facing surface 32 and side of a VSRI display apparatus 10, wherein in FIG. 1A a slidably positionable VSRI display member 12 is shown positioned to a maximum outwardly-extended state (or VSRI revealed state), and in FIG. 1C display member 12 is shown positioned to a fully retracted state (or VSRI non-revealed state). In FIG. 1C VSRI display member 12 and VSRI thereon slidably positioned to a VSRI non-revealed state within display apparatus body 22 are represented having a dashed outline. FIGS. 1B and 1D are each two-dimensional side view depictions of FIGS. 1B and 1D respectively i.e., their respective VSRI revealed states and VSRI non-revealed states. FIG. 1E is an end view of the VSRI display apparatus of FIGS. 1A-1D.

In FIG. 1A, a display apparatus housing 22 (or body) preferably of a compact size is depicted, adapted to be mounted or releasably attached to at least a generally vehicle-operator facing surface of a vehicle (e.g., a windshield), by one or more suitable apparatus fasteners or fastening means 58 adjacent rear side 28 (see FIGS. 1B and 1D) e.g., comprising an adhesive material, or peel-off sheet which reveals an adhesive material for use. It is noted that one or more of a variety of other fasteners or releasable fasteners can be adapted to a rear side 28 of an apparatus body 22 and are alternatively employable, for example, including but not limited to, one or more clips, hook-and-loop fasteners, adhesive double-sided tapes or materials, suction cups, hooks engageable within mounted loops, clamps, and the like.

The display apparatus housing 22 of FIG. 1A and FIG. 1C is depicted releasably attached to at least a generally vehicle-operator facing surface of a vehicle (e.g., a windshield) having a generally rectangular shape and interiorly comprising a principally rectangular shaped cavity 44 (depicted with a dashed-line perimeter) formed intermediate a housing front side 32 at least generally vehicle-operator facing, and a housing back side 28 facing a vehicle surface which is also at least generally vehicle-operator facing. FIGS. 1A and 1B further depict, extending outwardly to the right of the apparatus housing 22 and cavity 44 a slidably positionable vehicle operation safety-related indicia ('VSRI') display member 12 having displayed on a normally vehicle-operator facing surface thereof, (vehicle safety-related indicia) 'VSRI' 14, more particularly, (in FIGS. 1A and 1C) VSRI indicative or representative of a bicycle on a rack 40. FIGS. 1A and 1B further depict the VSRI display member 12 slidably positioned to an indicia displaying VSRI revealed state, having a fully extended range indicated by a bracket 16. VSRI of a VSRI display member, when selectively slid to a VSRI revealed state, is indicative of, representative of, or depicts, one or more objects extending outwardly from a side of a vehicle (i.e., the vehicle having a VSRI display apparatus 10 installed for use). The VSRI is thereby viewable and/or discernible at-a-glance in a repeatedly visually perceptible manner, to serve as a reminder of a like or similar actual one or more objects currently, or about to be, extending outwardly from a side of the actual vehicle. For example, a bicycle supported by a rack (e.g. of a type commonly employ atop a roof of an automobile) is selectively revealable as VSRI 14 by a VSRI display apparatus 10 by the operator of the automobile, when an actual bicycle secured to a roof rack mounted on the automobile, is currently, or about to be, transported by, or moved along with the automobile.

FIG. 1A further depicts an option to include on the front side, vehicle-operator facing surface 32, a secondary indicia display area 42 shown having dotted-line perimeter (e.g., depicted on a surface 32 located in FIG. 1A near a distal end 24 of the apparatus). Preferably indicia displayed in a secondary indicia display area 42, displayed on any portion of a vehicle-operator facing surface 32, is of a type relating to or associated with VSRI 14 of a VSRI display member concurrently slidably positioned to a VSRI revealed state. For example, information relating to a business entity providing one or more products and/or services associated with a VSRI 14 depicted one or more objects displayed on a VSRI display member 12 slidably positioned to a VSRI revealed state. More particularly, such information can include promotional or cross-promotional subject matter or content relating to one of a maker of, proprietor of, or service-provider associated with, indicia (VSRI) depicting or representational of one or more objects currently adjacent and extending outwardly from at least one side of a vehicle operated by, or about to be operated by, a vehicle operator. Such an entity may be an insurance company or business having an interest in proactively promoting vehicle-operation safety and the safety of vehicle operators, passengers, individuals, or other vehicles nearby, and the like. Other entities can include, but are not limited to, vehicle selling, rental or leasing businesses, makers of vehicle racks and/or vehicle rack mountable objects such as watercraft, skis, trailers, recreational vehicles, vehicles that can be towed, luggage, containers, and the Like. Additionally, or alternatively a secondary indicia display area 42 may be sized and shaped to include a displaying of a business card and/or company, brand or trademarked logo, and/or be equipped with a pocket or envelope into which a chosen business card or related indicia, information or content can selectively be inserted. Accordingly, an advertising, promotional or cross-promotional utility of a VSRI display apparatus 10 is also provided wherein any of such business entities can gain and/or accrue an increased awareness, relatedness to and/or association with VSRI of a revealed state VSRI display member 12 when concurrently represented in a indicia display area 42, wherein both are viewable at-a-glance and repeatedly visually perceptible to a vehicle operator (e.g., in a manner not visually impairing to a vehicle normally operated).

It is noted that the size and shape of the secondary indicia display area 42 depicted in FIG. 1A is merely an example, and that different sizes and shapes are alternatively employable. It is further noted that the planar appearance of the secondary indicia display area 42 depicted in FIG. 1A is merely a planar surface area example, and that different surfaces or contoured surfaces within a display area 42 are alternatively employable. For example, black-and-white, grayscale or color two-dimensional and/or three-dimensional indicia and/or alphanumeric text, symbols or characters, and the like, can be provided within a display area 42, wherein some or all of the indicia is one or more of: milled, CNC milled, laser cut, carved, routed, formed, embossed, printed, painted, silk-screened, displayable as pixelated or HD pixelated image content, etched, sand-blasted, masked, photo-luminescent, a hologram, reflective, translucent, placed, compounded, snapped on, pegged, force-fit, attached, adhered, screwed on, hung, glued, stapled, and the like.

It is noted that a secondary indicia or 'secondary VSRI' of a display surface area of a VSRI display apparatus normally vehicle operator facing, can be adapted to concurrently display or additionally comprise information relating to a maker of, or proprietor of, or service-provider associated with, a depicted one or more objects of a VSRI display member slidably positioned to a VSRI revealed state located adjacent the display surface area, wherein the information displayed is attached to, or adhered to, or inserted into a pocket or receptacle attached adjacent, the secondary VSRI display surface area. For example, wherein a business card of an individual or business entity is thus displayed.

Similarly, a VSRI display apparatus secondary VSRI display surface area normally vehicle operator facing, can be adapted to concurrently display or additionally comprise a depiction of a vehicle and/or information relating to or associated with at least one of a seller, or a renter, or a leaser of a vehicle (entity or individual) such that the secondary VSRI is concurrently located adjacent a VSRI display member slidably positioned to a VSRI revealed state, and wherein, the information displayed is attached to, or adhered to, or inserted into a pocket or receptacle attached adjacent, the secondary VSRI display surface area.

Embodiments of the present invention include variants wherein a secondary VSRI display surface area of a VSRI display apparatus normally vehicle operator facing, comprises three-dimensionally formed or rendered secondary VSRI. For example, comprising 3D text, business name, logo, trademark, brand, representation of a vehicle or vehicle type. For example, including, but not limited to a forming and/or rendering of 3D secondary VSRI by milled, laser cut, routed, carved, manually or by CNC enabled devices, or made of a casted or injection molded polymer material, vacuum molded, fabricated and so forth. Such three-dimensionally formed or rendered secondary VSRI, preferably relate to and/or are associated with a given one of: a maker of, a proprietor of, a service-provider associated with a depicted one or more objects of a VSRI display member slidably positionable to a VSRI revealed state, displayed concurrently adjacent the display surface area. Or related to and/or associated with one of: a seller, a renter, a leaser of a vehicle or vehicle type wherein the secondary VSRI display surface area commonly having one or more objects extending outwardly from at least one side of the vehicle or the vehicle type, that are of a type depicted by a VSRI display member slidably positioned to a VSRI revealed state adjacent the VSRI display.

In a first variant of the FIGS. 1A-1E embodiment, VSRI display member 12 is manually positionable in a slidable manner by hand or by one or more digits thereof, by a pushing inwardly on, or pulling outwardly of, a distal end portion of an indicia display member or a handle 18 (or end-grip) thereof, which in turn causes VSRI display member 12 to slide respectively inwardly and outwardly within housing passageway 34 of apparatus body side 26 in alignment with cavity 44 interior walls. Optionally end-grip 18 can include a display member grip-assist contoured portion 20 for example, an elongate groove suitable for engagement by a finger end, thumb nail or fingernail. Alternatively, the contour may be a raised or outwardly extending portion such as an elongate ridge, detent, flange, or a tab (not shown).

In a second variant of the FIGS. 1A-1E embodiment, VSRI display member 12 is manually positionable in a slidable manner by hand or by one or more digits thereof, for example when either approach imparts a lateral moving of a display member positioning lever or tab 30 associated with a VSRI display member 12 (e.g., extending outwardly from an end portion of a longer side thereof), which in turn imparts a corresponding lateral movement to display member 12. For example, wherein the lever or tab 30 extends outwardly sufficiently through a positioning lever elongate slot 38 (also depicted in FIGS. 1B-1D) so as to render easy adjustments. Preferably the lever or tab 30 shown extending outwardly through a slot 38 is configured such that at least one end or side thereof also serves as a lateral movement stop, for example to prevent a VSRI display member 12 from accidently sliding out of a display apparatus body 22.

In a manufacturing or making of some or all of a VSRI display apparatus 10 one or more of a variety of materials can be used. For example, the apparatus depicted in FIG. 1A can be made, comprising one or more of: wood(s), plastic(s), metal(s), paper(s), paperboard(s), card stock, or other planar and/or foldable sheet material(s). Designs of the preferred embodiments of the present invention described herein are such that a suitable one or more processes are enabled, such as: machining, forming, injection or vacuum molding, stamping, fabricating, die-cutting, laminating, fastening, welding, sonic welding, embossing, perforating, cutting, depositing or compositing, sand-blasting and/or forming of one or more of its components is/are employed. For example, with respect to FIGS. 1A-1E, and 4A-5B, a making of VSRI display apparatus 10 can comprise an aligning of separate sides of an upper housing portion and lower housing portion of a VSRI display apparatus 10, (or hinged clam-shell like arrangement), wherein the sides are brought into alignment with and are adjoining one another, such that a VSRI display member 12 is aligned with a housing passageway 34 and an end portion of cavity 44 (optionally including a tab or lever of a display member 12 brought into alignment with a elongate slot 38), and such that the positionable VSRI display member 12 is slidably operable within the display apparatus housing 22 in a manner previously described.

FIG. 1A further depicts a vehicle windshield 48 (shown in partial view) and an option of preferably locating and installing a VSRI display apparatus 10 proximate or adjacent a vehicle windshield perimeter portion 50, or a vehicle windshield corner 52, such as a vehicle windshield upper left perimeter portion. Thus installed, and within reach of a vehicle-operator, a manual positioning of the apparatus' slidable VSRI display member 12 (in a manner previous described) allows member 12 to be selectively slid to the right, to its fully-extended range indicated by bracket 16, which in turn, fully reveals VSRI 14 thereon, providing an aforementioned discernible or viewable at-a-glance and repeatedly visually perceptible reminders of such object(s), thereby serving to enhance safety during one or more operations of the vehicle. When the vehicle-operator is no longer transporting, or moving along with the vehicle, one or more objects extending outwardly from a side thereof, he or she may simply manually slide the slidable VSRI display member 12 to the left such that the display member 12 is fully concealed, a fully retracted stated including only the end-grip 18 (see retracted range/bracket 36), and such that the VSRI display apparatus 10 is then fully minimized in size.

FIGS. 2A and 2B are each a two-dimensional depiction of a VSRI display apparatus 10 operable in a manner previously described, and unobtrusively mounted, or releasably fastened to an interior-facing surface of a vehicle windshield 48, in reach of, and in a manlier not impeding a view of, a vehicle operator when normally looking forward. FIG. 2A depicts a windshield 48 e.g., of a type including a rear-view mirror 54, accommodating in a first instance, a vehicle-operator nearest a VSRI display apparatus 10 installed for operation proximate or adjacent an upper left portion of the windshield such that a VSRI display member 12 is extendable for to the right for a displaying of VSRI, or, in a second instance, accommodating a vehicle-operator nearest a VSRI display apparatus 10 installed adjacent an upper right portion of the windshield such that a VSRI display member 12 is extendable for to the left for a displaying of VSRI. In either case in FIG. 2A, a given VSRI display apparatus 10 is depicted mounted in a compact-sized area adjacent or proximate a respective upper windshield corner 52 and/or windshield perimeter portion 50 and is so located to be within reach of a respective nearest vehicle-operator of the vehicle and thereby operable in a manner previously described.

FIG. 2B depicts options to unobtrusively mount or releasably fasten a first VSRI display apparatus 10 in a compact-sized area adjacent or proximate a lower windshield corner 56, or to releasably fasten a second VSRI display apparatus 10 in a compact-sized area such that at least a display apparatus body 22 is located principally in front of a vehicle-operator facing surface of a lowered a sun-visor 60 with the VSRI display member 12 operable in a manner previously described.

FIGS. 3A and 3B respectively are each a two-dimensional, partial cross-sectional side view depicting a forward portion of a vehicle roof 62 adjoining an upper side of a vehicle windshield 48, wherein a VSRI display apparatus 10 is releasably fastened unobtrusively within a compact-sized area adjacent or proximate a windshield at a location similar to those of an upper windshield corner 52 in FIG. 2A, and a lower windshield corner 56 in FIG. 2B. FIG. 3B further depicts an option to unobtrusively mount or releasably fasten a VSRI display apparatus 10 such that at least a display apparatus body 22 thereof is located principally in front of a vehicle-operator facing surface of a lowered a sun-visor 60. For example, wherein a releasable fastening means associated with the display apparatus body 22 comprises one or more clips or clamps of a size sufficient to clip or clamp the apparatus body 22 to a lower portion of the sun-visor. It is noted that the locations of either or both of the two VSRI display apparatuses 10 depicted in FIG. 2B (in a left windshield portion) can alternatively be located on the opposite side of windshield 48 in a right windshield portion) e.g., for example in a manner previously described in reference to FIG. 2A.

In reference to the two-dimensional depictions of FIGS. 4A through 5B, a VSRI display apparatus 10 similar to that of FIGS. 1A and 1C is depicted, wherein in FIGS. 4A and 4B a positionable VSRI display member 12 is selectively, slidably positionable upwardly and downwardly in alignment within a housing passageway 34 of a lower longer side of a display apparatus body 22, and in FIGS. 5A and 5B a positionable VSRI display member 12 is selectively slidably positionable upwardly and downwardly within a housing passageway 34 of an upper longer side of a display apparatus body 22. Similar to FIGS. 1A through 1E, FIGS. 4A through 5B further depict an option to locate an elongate slot 38 within a side of display apparatus body 22, (i.e., vehicle-operator facing surface 32), such that a display member positioning lever, knob or tab 30 therein, associated with an interior portion of, or adjacent side of the facing surface 32, is slidably operable in the slot (vertically), and is readily accessible to and within reach of a vehicle-operator so as to selectively cause a respective sliding of VSRI display member 12 by a manual imparting of an upward or downward movement of the knob 30 (in a manner similar to the lateral moving of a display member positioning lever or tab 30 associated with a VSRI display member 12 in FIGS. 1A through 1E. Also similar to FIGS. 1A through 1E, FIGS. 4A through 5B further depict an option to alternatively or additionally manually and selectively impart an upward or a downward positioning of a VSRI display member 12 by use of an end-grip 18 (in a manner similar to a previous description).

Accordingly FIGS. 1A and 1C and FIGS. 4A through 5B respectively, and the foregoing descriptions pertaining to each, disclose how a positionable VSRI display member 12 is: (a.) selectively, slidably positionable horizontally in and out of either of the opposite shorter vertical sides of a display apparatus body 22, and (b.) selectively, slidably positionable vertically in and out of either opposite longer horizontal sides of a display apparatus body 22, by use of a tab-in-slot VSRI positioning and displaying method, and/or an end-grip VSRI positioning and displaying method.

FIGS. 4A and 4B further depict an option to include a somewhat outwardly expanded (or widened) distal end portion of a VSRI display member 12, wherein a stepped portion 144 of display, member 12, comprising an angled leading edge and trailing edge, is located proximate a side of interior cavity 44 adjacent the latch mechanism 100. In a latching operation, during a manual positioning of member 12, entailing a sliding of the member upwardly from the fully-revealed state of FIG. 4A to its fully-concealed state of FIG. 4B, the angled leading edge of 144 makes contact with a lower opposite angled edge of detent 104 which is turn imparts an outward bending or flexing of resilient member 102. As stepped portion 144 clears the pass detent 104, such that the trailing angled edge of 144 comes into contact with an upper opposite angled edge of detent 104 the bending of resilient member 102 is returned to a non-bended state (as depicted in FIG. 4B) which in turn retains the VSRI display member in a VSRI non-revealed state. Thus configured, at least one portion of at least one of opposite parallel sides of a VSRI display member, is adapted to align and engage, upon being slide positioned, with an end contour portion of a latch mechanism, to releasably retain the VSRI display member in at least one slide positioned VSRI state (e.g., a VSRI display member revealed or non-revealed state). A similar arrangement is also depicted if FIGS. 5A and 5B.

During a reverse manual positioning of the VSRI display member 12, following a slide positioning downwardly from a VSRI non-revealed state (of FIG. 4B) to a VSRI revealed state (of FIG. 4A, the lower angled edge of 144 contacts an upper opposite angled edge of detent 104 which is turn imparts an outward bending or flexing of resilient member 102. As stepped portion 144 starts to pass detent 104, the upper angled edge of 144 begins to contact a lower opposite angled edge of detent 104 and as the member 12 slides more, the outward bending of resilient member 102 is returned to a non-bended state (as depicted in FIG. 4A).

Preferably the apparatus body 22 of FIGS. 4A and 4B, when not also including a slot 38 and knob, tab or lever 30, comprises two spaced apart stops 142 located at opposite sides of cavity 44 (proximate opposite sides of a housing passageway 34) each having a contour which prohibits a further downward sliding of corresponding wider or stepped portion 144 at a distal end of a VSRI display member 12, once member 12 has reached a fully-revealed state. In a variant including a slot 38 and a knob, tab or lever 30 slidably operable therein, a lower end portion of the slot serves as a stop, once the knob, tab or lever 30 (adjoining a portion of the display member) is slid to the lower end of the slot. Thus, in this variant, both the stop 142 and an outwardly extending stepped portion 144, each shown to the right of lower end of the slot 38 in FIG. 4A, are not required.

It is noted that the resilient member 102 portion of a latch mechanism 100, whether located adjacent a side of a cavity. 44 (or alternatively incorporated, formed or cut, so as to be adjacent a side portion of a display member 12 e.g., including a detent portion) may be made of wood(s), plastic(s), metal(s), a composite material, and in lighter-weight embodiments of the VSRI display apparatus 10, may be a paperboard or card stock material. For example, a wood resilient member 102 could consist of an elongate stick, slat or strip of wood secured at one end to a display apparatus body 22 and be of sufficient length to provide both a flexing or bending as needed and a sufficient engagement of a detent 104 when aligned within a corresponding indent. In a CNC milling of a display apparatus body 22 made of wood, plastic or metal portion e.g., adjacent a cavity 44, the milling can render an elongate slat or strip of wood such that one end thereof is integrally part of a display apparatus body 22 while an elongate portion is free to bend, unbend or flex, as needed. Alternatively, a spring or spring mechanism can be associated with an elongate member to provide a necessary bending, unbending or flexing as needed. In another approach, a straight or formed portion of a piano wire or a spring steel can be secured at first end to a portion of a display apparatus body 22 while having attached to, or shaped at, a second opposite end an object or a shaped contour sufficient to provide an engagement with an indent contour as needed, and so on.

FIG. 4A also depicts a larger somewhat centrally located secondary indicia display area 42 option, whereas FIGS. 5A and 5B depict a smaller and taller-than-wide secondary indicia display area 42 option.

FIGS. 4A through 5B further depict an optional interiorly-located latch and release mechanism 100 operable to predispose a two-state positioning of a VSRI display member 12 wherein a first state positioning of display member 12 (and VSRI thereon) is a fully-concealed state depicted in FIGS. 4B and 5A, and a second positioning of the display member 12 (and VSRI thereon) is a fully-revealed state depicted in FIGS. 4A and 5B. Wherein, in one example of an interiorly-located latch and release mechanism arrangement (depicted in FIGS. 4A through 5B) an elongate latch resilient member 102 having on a distal end a contoured inwardly-extending detent 104 is located proximate a side of an interior cavity 44, such that a contoured latch engagement indent 106 or profile, associated with a portion of an outwardly-facing side of a VSRI display member 12 (preferably hidden from view) is engaged by the detent when the VSRI display member 12 is slid to a first, fully-concealed state e.g., as depicted in FIGS. 4B and 5A; and, when the VSRI display member 12 is slid to a second, fully-revealed state e.g., as depicted in FIG. 5B.

FIGS. 5A and 5B depict an option to include a plurality of contoured latch engagement indents 106 associated with a same outwardly-facing side of a VSRI display member 12 e.g., such that an upper engagement indent 106 of display member 12 is engaged by an inwardly-facing detent 104 adjoined with a distal end of elongate resilient member 102, when member 12 is manually slid to a first, hilly-concealed state; and, a lower engagement indent 106 on the same side of display member 12 is engaged by a detent 104 of elongate resilient member 102 when member 12 is when member 12 is slid to a second, fully-revealed state. Thereby, the latching mechanism 100 of FIG. 5 predisposes the VSRI display member 12 to be retained in a first, fully-concealed state, or a second, fully-revealed state, when the display member 12 is manually slid to either state, until a manual urging of member 12 in an opposite direction, is sufficient to overcome a current latched engagement.

FIGS. 6A-6C and 7A-7F are each a two-dimensional depiction of some of the preferred embodiments of the VSRI display apparatus 10 each adapted to include an appearance of and/or shape, replicating, representative of or depicting a vehicle, or vehicle type or make, typical of a type commonly incorporating, having or moving (for at least some time-period) one or more objects extending outwardly from at least one side of the vehicle (see also FIGS. 8A through 9D). For example, FIGS. 6A-6C and 7A-7B include an apparatus body (or housing) having a front side surface area 32 which is normally vehicle operator-facing, and which further comprises at least a depicted likeness, appearance and/or shape of an actual vehicle or vehicle type operated by or about to be operated by, the vehicle operator. The apparatus body depicted vehicle comprises at least one vehicle side adapted to display VSRI of a display member slidably positioned to a VSRI revealed state, extending outwardly from the side (e.g. as depicted in FIGS. 6C and 7B), wherein, the vehicle side is representative of a same or similar side of the actual vehicle or vehicle type operated by, or about to be operated by, the vehicle operator; and wherein, one or more objects depicted by the display member positioned to the VSRI revealed state are the same or similar to the object(s) extending outwardly from the side of the actual vehicle. FIGS. 6A-6C and 7A-7F also depict an option to make, form or fabricate such embodiments comprising a foldable sheet or planar material (see other variants of folded sheet or material embodiments depicted in FIGS. 7A-7F, 8A-8D and 9A-9D).

Accordingly, embodiments provided, comprise a depiction and/or shape of a vehicle 84 on a vehicle-operator facing surface 32, e.g., of an actual vehicle or vehicle type in use by, or about to be used by a vehicle operator, and at least one VSRI display member 12 slidably positionable between VSRI display member revealed and non-revealed states intermediate a front and back side of the apparatus 10, and which, when slid to a fully revealed state depicts one or more objects extending outwardly from a particular side of the depicted vehicle (as in FIGS. 6C and 7B). The depicted type of one or more objects and their location adjacent a specific side of a vehicle 84 indicate a same type of one or more objects extending outwardly preferably from a same side of the actual vehicle operated by the vehicle operator.

Thus vehicle-depicting embodiments of the present invention also provide an enhanced vehicle operation safety awareness, or 'reminders' that are viewable at-a-glance and repeatedly visually perceptible to the vehicle operator and which emphasize where objects exterior to a specific vehicle side are located, for enhancing vehicle safety during one or more operations of the vehicle. The VSRI display member 12 and VSRI thereon, are viewable and/or discernible at-a-glance when slidably positioned to a VSRI revealed state, which also allows for a quick association to be made between the object(s) depicted by the apparatus 10, in view of one or more objects or conditions currently nearby and/or about the actual vehicle. For example, a vehicle having at least one bicycle mounted atop a roof upper 'side' rack, and having a vehicle operator in control of the vehicle who has selectively positioned a VSRI display member 12 of VSRI display apparatus 10 to a VSRI revealed state, such that 'bicycle' indicia as in FIG. 6C has been seen one or more times can, prior to entering a garage or multi-level parking structure where a vertical clearance may be an issue, be made more aware and mindful that caution may be in order due to an upwardly extending actual bicycle, significantly increasing a height clearance needed to safely operate the vehicle.

In FIG. 6A a planar or sheet material is foldable transversely, for example, foldable along a fold-defining perforation or score line 78 e.g., along a midway point, and having aligned adjacent a portion of the score line (or transverse fold) a passageway 34 e.g., an elongate slot located and sufficient in width to readily allow an inward and an outward sliding of a pivotally positionable VSRI display member 12 (depicted in FIGS. 6A and 6B having a dashed-line). An apparatus rear side 112 is depicted having an apparatus fastener or fastening means e.g., an adhesive material, or peel-off cover sheet which when removed reveals such, wherein the fastener of fastening means is preferably suitable for positively attaching or releasably fastening the VSRI display apparatus to a vehicle-operator facing surface such as a previously described compact area of a windshield, of a sun-visor or (as depicted in FIG. 20) of a dashboard, instrument or control panel. Following a folding along the score line 78, the VSRI display apparatus 10 has a rectangular shape with a vehicle-operator facing surface. 32 and a rear side 112 aligned behind surface 32, as depicted in FIGS. 6B and 6C.

During a making of a VSRI display apparatus 10 comprising a foldable planar material, preferably the material is printed, optionally laminated, and then die-cut, cut, CNC cut, CNC milled, laser cut, or punched to provide one or more: display member positioning slot(s), aperture catch (es), J-hook aperture, secondary-indicia viewing window, pivot lever aperture e.g., providing a pivot lever opening through which a lever lower end adjoining with a pivot-point portion of a display member occurs. A die-cutting or punching process can be employed to provide one or more folds lines, scores and/or perforations. Following one or more of such process steps, a VSRI display apparatus 10 can be assembled, e.g., wherein in reference to FIG. 6A the VSRI display apparatus 10 is folded along a folding perforation or score line 78, a lower end of a pivot lever 96 is inserted through a pivot lever aperture of surface 32 and coupled to a corner pivot point of a VSRI display member 12 which in turn has indicia 14 thereon, such as a bicycle mounted on a roof rack 40, and may also include a staple 108 (or other ridged or upwardly extending rounded member). Interior sides of the two halves of the apparatus are then brought together and adjoined or releasably fastened e.g., by an adhesive material, or by fasteners such as two spaced apart staples 98, the material or staples placed so as to not impede a 90° pivoting of the display member. Alternatively, sides of the apparatus can be brought together and adjoined or releasably attached by interfacing, releasably fastenable snaps, one or more tabs of a first side inserted into or engaged with a respective one or more slots of a second side, hook-and-loop material, magnets, and the like.

More specifically, a foldable body of a VSRI display and a VSRI display member operable to be slidably positionable between VSRI non-revealed and revealed states between the folded sides of the body, can comprise a foldable planar or sheet material, or plastic laminated foldable planar or sheet material, wherein the material on at least one side, includes a plurality of the following, (but is not limited thereto): (i.) printed VSRI subject matter of a VSRI display member, (ii.) printed secondary VSRI subject matter of a normally vehicle operator facing portion of at least the VSRI display apparatus body, (hi) a crease or ridge indented into the material along which the material is folded (or along which a fold is to occur), (iv.) at least one normally vehicle operator facing blank portion within which a dry erase marker hand written erasable note can be entered, (v.) a printed depiction or representation of a vehicle, including at least one side of the depicted vehicle adjacent which a VSRI display member depicted one or more objects are slidably positionable between VSRI non-revealed and revealed states; wherein the the body of a VSRI display apparatus, the at least one VSRI display member and one or more more apertures or cuts of at least the body are die-cut, or made by a CNC laser.

FIGS. 6B and 6C further depict an option to include a retail-display J-hook aperture 198 e.g., that can be employed when a VSRI display member 12 is predisposed to be retained in a fully concealed state (as in FIG. 6B).

A planar foldable material of a VSRI display apparatus 10 can comprise any one or more of a variety of materials, such as, card stock, paperboard or cardboard, preferably well suited for one or more of: printing of silk-screening in black-and-white, grayscale, and/or color, laminating, embossing, contouring, shaping, stamping, die-cutting, cutting, laser-cutting, CNC milling, stapling, gluing, hot-gluing, and the like. Other foldable planar materials can include a thin sheet or layer of material, for example a plastic, a metal, a composite or carbon fiber material, leather, or a cloth or textile material (e.g., sufficiently supported by a covering, treatment or backing to thereby be self-supporting).

The foldable embodiment of FIGS. 6A through 6C includes a depicted likeness of a vehicle 84, preferably of a type in which the apparatus 10 is intended to be mounted or releasably fastened. In FIGS. 6A and 6B a slidably positionable VSRI display member 12 (depicted in a dashed-line) is pivotally controllable by a pivot adjustment lever 96 associated with the display member, such that an imparting of a manual pivot input to the lever, made by one or more digits of a user's hand selectively and slidably positions the display member 12 between a concealed state depicted in FIGS. 6A and 6B, and a revealed state depicted in FIG. 6C (over a pivot range 126). While being selectively positioned pivotally between fully revealed states and fully concealed states, VSRI display member 12 passes through a housing (or body) passageway 34. It is noted that instead of employing a pivot adjustment lever 96 for selectively imparting a pivot positioning or partial rotation of a VSRI display member 12, the member can be pivotally fastened at a corner pivot point to an apparatus surface and an arced slot (not shown) formed into surface 32 relative to the pivot point, such that a knob associated with the display member and operable to slide within the slot (in similar manner previously described) can alternatively be selectively employed to pivotally position the display member between a concealed state depicted in FIGS. 6A and 6B, and a revealed state depicted in FIG. 6C (over a full pivot range 126).

To predispose a retaining of display member 12 when pivoted or partially-rotated to a fully-concealed state or a fully-revealed state, one or more aperture catches or latches 68 each sized interiorly to receive and surround a small elongate member having a ridged profile (e.g., an upper portion of a fastened staple 108) are employable. For example, in FIGS. 6B and 6C a horizontal aperture catch 68 is formed in an upper right portion of surface 32, and a vertical aperture catch 68 is formed in a lower, left of center portion of surface 32. In operation, a pivot adjustment lever 96 associated with the display member 12 (so as to impart rotation thereto) is manually positioned over a lever pivot range 120 (e.g., 90°). Beginning (in FIG. 6B) with a lever position of about 9 o'clock and with a vertical staple fastened through a corner of display member 12 and a vertical aperture catch 68 surrounding the staple, a manual urging of a counter clockwise pivot imparted to the lever causes a retention of the vertical staple 108 within the vertical aperture catch 68 to be released and as the counter clockwise pivot range approaches 90° (with the lever position at about 6 o'clock) the staple, then nearly horizontal, is urged into alignment with the horizontal aperture catch 68 (in FIG. 6C) and is retained therein until a fully reversed positioning of the lever 96 occurs.

FIG. 6B depicts an option to additionally or alternatively include a VSRI display member 12 having an outwardly extended positioning tab 110 (or tab grip) which is accessible adjacent a side of an VSRI display apparatus 10 to a vehicle-operator when the apparatus is installed for use (shown adjacent an upper of apparatus 10). Optionally the tab 110 can include a surface portion having a rim and/or ridged portion which facilitates imparting a manual moving or pivoting of display member 12 over a range 126. For example, the tab can include a tab aperture 198 which, as depicted in FIG. 6B can be employed as a J-hook aperture e.g., during a displaying of the apparatus as a product.

Thus, embodiments of the present invention configured for a user imparting a straight or arced positioning to a VSRI display member 12 also having an adjacent positioning tab 110 can be simplified. For example, VSRI display apparatus 10 embodiments (installed for use in a vehicle) having a linearly positionable VSRI display member 12 (positionable over a straight path) and a side adjacent positioning tab 110 accessible to a user when the display member 12 of the apparatus is fully positioned to a concealed state, eliminate the need for an elongate slot and display member tab slidably operable therein. For example, the linearly positionable display member 12 depicted in FIGS. 7A and 7B can alternatively (or additionally) be configured having a positioning tab 110 extending outwardly adjacent a right side of the member, accessible for an imparting of a linear positioning by a vehicle-operator thereto. VSRI display apparatus 10 embodiments (installed for use in a vehicle) having a pivotally positionable VSRI display member 12 (positionable over an arced path) and a side adjacent positioning tab 110 accessible to a user when the display member 12 of the apparatus is fully positioned to a concealed state, eliminate a need for a pivot lever 96 (and lever aperture), and instead allow a simpler pivotally fastened display member 12 e.g., fastened at a pivot-point near a corner of the member to an interior side of the apparatus, for example by a simple, single rivet (fastener).

In reference to FIGS. 7A through 7F, FIG. 7A depicts a vehicle 84, preferably of a type in which the apparatus 10 is installed for use (or a likeness thereof), wherein the VSRI display apparatus 10 is made having a shape of the vehicle e.g., cut, die-cut, stamped, laser cut, or CNC milled in a manner rendering the vehicle shape. FIGS. It is noted that the depicting of a vehicle shape is not limited to only the foldable preferred embodiments. For example, such vehicle are also employable in the preferred embodiments of FIGS. 1A-1E, 4A-5B, 10C and 11C each having a thicker apparatus body 22. FIGS. 7A and 7B depict an option to also include on a VSRI display member 12 readable safety-related indicia 122 (e.g., alphanumeric text) which is selectively positionable into alignment with a secondary-indicia viewing window 124 when the member is positioned from a concealed state (depicted in FIG. 7A) to a revealed state (depicted in FIG. 7B). VSRI display member 12 can be configured positionable by a tab-in-slot arrangement e.g., a tab 114 in an elongate slot 118 and/or by the aforementioned extended tab 110 arrangement e.g., as described in reference to FIG. 6B. In the case of a tab-in-slot arrangement, FIGS. 7C and 7D depict an option to include a single layer tab 114 slidably operable in an elongate slot 118 as depicted in FIG. 7A and the cross-sectional side view of FIG. 7D; and, FIGS. 7E and 7F depict an option to include a folded or layered tab 116 slidably operable in an elongate slot 118, wherein a tab 116 is foldable at perforation or score lines 78, e.g., in a manner depicted in the cross-sectional side view of FIG. 7F, for a selective slidable positioning of a respective VSRI display member 12 in slot 118.

During a making (or assembly) of the VSRI display apparatus 10 depicted in FIG. 7A, either tab (114 or 116) of the VSRI display members 12 is inserted into slot 118, the VSRI display apparatus 10 of FIG. 7A is folded along the perforation or score line 78 and interior sides of the apparatus are brought together and fastened in a manner previously described so as to appear as the shaped vehicle depicted in FIG. 7B.

Thereafter, when the apparatus 10 is installed for use in a vehicle, e.g., mounted or releasably fastened by a suitable fastening means 58 in a manner previously described, within reach of an operator of the vehicle (e.g., a vehicle having a likeness of the shaped vehicle), the operator can selectively impart to a single layer tab 114 or a layered tab 116 of a VSRI display member 12 a manual positioning by hand or one or more digits thereof, such that the display member 12 is positioned to either a concealed state (depicted in FIG. 7A) or a revealed state (depicted in FIG. 7B), wherein in the latter case, preferably a readable safety-related indicia 122 is concurrently positioned into alignment with a readable-indicia viewing window 124.

Preferably (or optionally) the vehicle-operator facing surface 32 of the vehicle-depicted VSRI display apparatus 10 of FIGS. 7A and 7B includes a displayed secondary indicia display area 42 e.g., comprising associative indicia, subject matter or content pertaining to a business entity providing one or more products and/or services relating to the one or more objects displayable on a fully revealed VSRI display member 12. Alternatively, such associative indicia, subject matter or content can be made displayable in a readable indicia viewing window 124, by a linear positioning, of a display member 12 e.g., when positioned to a fully revealed state.

In reference to FIGS. 8A-8D and 9A-9D each is a two-dimensional depiction of another of the VSRI display apparatus 10 preferred embodiments of the present invention, and comprises: a depiction or likeness of a vehicle 84; an option to include a plurality of slidably positionable members preferably layered one in front of another (80 and 82 respectively), each having a lower end, which when fully-revealed, represents a plurality of objects extending outwardly from a side of the depicted vehicle 84 (e.g., 80 having a pair of aircraft flaps 74, and 82 differently having an aircraft landing gear arrangement 76); and, preferably including a plurality of object-status indicia viewing windows (90 and 92 respectively) in which each selectively indicates a first indicated status indicia of the objects and alternatively a second indicated status indicia of the objects. FIGS. 8A and 8C depict interior features of the embodiment, and FIGS. 8B and 8D depict exterior features of a vehicle-operator facing surface 32 of the embodiment.

It is noted that certain reference numerals in FIGS. 8A through 8D such as 74 and 76 do not appear in all of the figures e.g., when their respective positionable display members are slid to a fully-concealed state, and/or when a reducing of reference numerals in a figure facilitates a clearer depicting of an apparatus 10 and/or body 22 exterior surface.

The VSRI display apparatus 10, and display apparatus body 22 thereof, in each of the 8A-8D and 9A-9D embodiments can be made of a foldable material and mounted or releasably fastened in a vehicle in a manner previously described (or similar thereto), or in a manner more akin to the embodiments previously described in any of FIGS. 1A-1E and 4A through 5B, and/or as described hereinafter in any of FIGS. 10C, 11C, 14A through 15, 16A through 19.

Returning to FIGS. 8A-8D, FIG. 8A is depicted preferably having an interior cavity 44 (shown in a dashed-line including parallel, opposite vertical sides) and in which, parallel opposite outer sides of each of a first positionable member 80 (shown in a dashed-and-dotted line) and a separate second positionable member 82 (shown in a dotted-line) are aligned slidably intermediate the parallel opposite sides of the cavity. Alternatively, manually positionable members 80 and 82 can each have entirely a distinct cavity or in part a shared cavity. In embodiments not having an interior cavity, such as those previously described having a display apparatus body 22 comprising a foldable material, one or more vertically orientated staples can be employed adjacent each of the opposite sides of the two positionable members (80 and 82), to align and channel the members 3G when separately slidably positioned to a vertical axis of movement, wherein the same staples also serve as fastening means securing a front and rear portion of body 22 together (not shown).

FIGS. 8A-8D further depict an option to employ an inclined plane, for example of a positionable member angled slot 70, in a translating of manual horizontal positioning adjustments inputted via an adjustment knob 72 slidably operable in a horizontal slot 38, into corresponding vertical adjustments of a respective positionable member (80 or 82). For example, in a lowering of the flaps 74 of the depicted-aircraft (84), a first portion of an adjustment knob 72 extending inwardly (from the back of the knob, relative to the surface 32 of apparatus body 22) intermediate opposite sides of the perimeter-wall of horizontal slot 38, is constrained along a horizontal path by slot 38 as the knob is positioned laterally. More specifically, when the knob 72 is selectively positioned to the right, a second portion of the knob 72 extending further inwardly, intermediate opposite side portions of the perimeter-wall of angled slot 70 (and portions of positionable member 80 proximate thereto), the second portion interacts with a 'lower inclined plane' of angled slot 70, which in turn, causes a lowering of positionable member 80 and the flaps 74 at its lower end. Conversely, when the adjustment knob 72 is selectively positioned to the left (during a raising of member 80), the second portion of the knob extending further inwardly, again, intermediate opposite side portions of the perimeter-wall of angled slot 70 interacts with an 'upper inclined plane' of slot 70, which in turn, causes a raising of positionable member 80 and the flaps 74 at its lower end.

Preferably a relatively short shaft extending below an adjustment knob 72 comprises a plurality of small diameter (<0.5") flanges (preferably circular), or planar members configurable closely parallel to one another, such as: (a.) vertically aligned horizontal circular plates, or (b.) reduced-circumference shaft channels into each of which a substantially encircling collar, disk-shaped keeper, split washer or the like, can be secured, or the like. Wherein, a distal shaft portion intermediate a first pair of planar members is slidably operable in an angled slot 70 of a respective positionable member (80 or 82) such that facing surfaces of the planar members are in close contact with upper and lower surfaces of the positionable member, thus keeping the knob shaft more perpendicular when being positioned laterally and enhancing a retention of a shaft portion within a respective slot. Optionally or additionally, a similar arrangement can occur for a next shaft portion between a second pair of facing surfaces, wherein the shaft portion is nearest the knob and slidably operable in a horizontal slot 38. Another approach can include vertically alignable snap together elements (or configured for gluing or sonic welding), somewhat T-Nut or golf ball marker like, with vertical post diameters sized to a slot and disk portions akin to, or somewhat smaller than, a thumbtack diameter, preferably wherein an upper most element positively receives a Knob lower shaft. An example or approximation of a circular or disk-shaped member, or circular flange, is depicted in a dashed line in FIGS. 8A and 8C.

In operation, a selective positioning of a knob 72, from a left-most position to a right-most position (the latter depicted in FIGS. 8B and 8D) in turn, positions the flaps 74 of a first positionable member 80 downwardly, from a fully-concealed state (depicted in FIGS. 8A and 8C) to a fully-revealed state (depicted in FIGS. 8B and 8D). Wherein, the flaps 74 slidably pass in and out of a respective flap passageway 64. Similarly, a selective positioning of a knob 72, from a left-most position to a right-most position, in turn, positions the landing gear 76 of a second positionable member 82 downwardly, from a fully-concealed state (depicted in FIGS. 8A and 8B) to a fully-revealed state (depicted in FIGS. 8C and 8D). Wherein, the landing gear 76 slidably pass in and out of a respective passageway 66. Thus, when both knobs 72 are positioned to a left-most position, no objects associated with the vehicle (the depicted aircraft 84) are shown extending outward from a side thereof. Conversely, when both knobs 72 are positioned to a right-most position, both object types associated with the depicted vehicle (84) are shown extending outwardly from a side thereof. When either object type is shown extending outwardly it serves as a readily discernible and repeatedly visually perceptible at-a-glance reminder providing an enhanced vehicle operation safety awareness during one or more operations of the vehicle.

Adding to an enhanced safety awareness is an interactivity of such VSRI display apparatus 10 embodiments FIGS. 8A through 8D further depict an option to include additional and associative vehicle operation safety related discernible-shape indicia which are revealed concurrently to thereby reinforce a comprehending of a given status and status changes. For example, in FIG. 8A a first status indicator window 90 and preferably a second status indicator window 92 each respectively display an alphanumeric first indicated indicia 86 and a second indicated indicia 88 indicia indicating respectively, when flaps 74 or landing gear 66 are up or down, text that reads respectively "raised" or "lowered". Preferably adding to an enhanced safety awareness attributable to the meaning of either word visually seen and read, is an interactive or kinesthetic process wherein the user can read associative-indicia within a personalized phrase indicating a "Flaps" status or as there is a "Flaps" status change wherein either or both result from a user input. For example, in FIG. 8A, the indicator window 90 displays the personalized phrase "I 'Raised' The Flaps" wherein the second word of the phrase is changed as a result of user physical or tactile input and occurs concurrent with a visual reinforcing representation of the Flaps 47 having just been 'raised'. In FIG. 8B, the personalized phrase "I 'Lowered' The Flaps" is depicted, wherein the second word of the phrase was changed as a result of a user physical or tactile input, concurrent with a visual representation of the flaps 74 having just been 'lowered'. Similarly, a second status indicator window 92 provides a same interactive or kinesthetic process for changes in status pertaining the landing gear 76.

FIGS. 8B and 8D further depict another type of vehicle safety related associative indicia preferably occurring concurrently with those just described, wherein a depicted horizontal "FLAPS" related slot 38 and a "GEAR" related slot 38 optionally (or additionally) each include "UP" and "DOWN" status indicators corresponding to a lateral (left-most or right-most) position to which a user has moved a respective knob 72. Thus, as a user is manually (kinesthetically) sliding a knob 72 of a "FLAPS" slot 36 from a left-most position to right-most position, he or she (a.) sees the flaps being lowered, (b.) sees the alphanumeric indicia change from 'Raised' to 'Lowered'. (c.) sees the personalized phrase change to "I 'Lowered' The Flaps" and (d.) sees the right-most positioning of the adjustment knob 72 directly under the word "DOWN" as in "FLAPS: . . . DOWN". Conversely, the process works in reverse i.e., as a user is manually (kinesthetically) sliding a knob 72 of a "FLAPS" slot 36 from a right-most to a left-most position. The similar sequence of associative-indicia revealing steps occur when applied to an adjustment know 72 of a "GEAR" slot 38.

FIGS. 8B, 8D and FIGS. 9A through 9D further depict the option to include a secondary indicia display area 42 (shown in dashed line) for example, indicia pertaining to a business entity providing products or services relating to the depicted vehicle type 84.

In reference to FIGS. 9A through 9D depict a similar sequence of four drawing figures wherein, in FIG. 9A no objects are shown extending outwardly from a side of the depicted-vehicle 84, in FIG. 9B only flaps 74 are lowered, in FIG. 9C only landing gear 76 are lowered, and in FIG. 9D both the flaps. 74 and landing gear 76 are lowered. FIGS. 9A through 9D further depict vertical slots 38 wherein an adjustment knob 72 selectively slid fully-upward indicates that a respective slidably positionable VSRI display member 12, associated with and responsive to a positioning of the knob, is also fully-up and vice versa. Preferably, a vertical positioning of a display member 12 indicates in a respective status indicator window 90 or 92 an indicated alphanumeric indicia e.g., "Raised" or "Lowered" in a manner previously described.

It is noted with respect to the preferred embodiments depicted in FIGS. 8A through 9D that any one or more of the aforementioned latching mechanisms or means, and/or stops or stepped contours can be adapted to limit a slidable positioning range and/or predispose a retaining of a display member 12 at one or more predetermined heights. Thus, flaps 74 for example, could be set in accordance with different predetermined degrees or increments of settings and concurrently indicated in a respective status indicator window 90 or 92 as such.

While FIGS. 8A through 9D each depict a VSRI display apparatus 10 having a plurality of selectively slidable display members each indicative of, representing or depicting a different type of object extendable outwardly from a side of a vehicle, it is noted that such members can additionally or alternatively comprise display VSRI content 14, and can be adapted to one or more other ones of the preferred embodiments, including wherein, a first member is configured selectively slidably positionable between concealed and revealed states with respect to a first vehicle side, and at least a second member is configured selectively slidably positionable between concealed and revealed states with respect to at least one other vehicle side (of a same apparatus 10 depicted vehicle).

In reference to FIGS. 10A through 11C, FIGS. 10A and 10B and FIGS. 11A and 11A are each a cross-sectional two-dimensional depiction of a VSRI display apparatus 10, depicting an option to mount or releasably fasten either at least one rearward-facing portion of an interior apparatus member 46, or one or more rearward-facing portions of an exterior or outer apparatus member 94, in a stationary manner, to a vehicle windshield, dashboard or control panel (i.e., a vehicle interior mounting-surface 132 thereof), such that an adjacent non-mounted one of the two apparatus members is available to be selectively positioned in a slidable manner manually by a vehicle operator. FIGS. 10C and 11C respectively are each a three-dimensional depiction of an under-side of FIGS. 10A-10B and FIGS. 11A-11B.

Each of FIGS. 10C and 11C depicts a rear-side 112 of a VSRI display member 46 and a rear-side 112 of an exterior or outer apparatus housing member 94 (or body) on either of which a suitable fastening means 58 can be employed or applied to mount or releasably attach either member, in a stationary manner, to an appropriate vehicle surface portion at least generally vehicle-operator facing, for example, using a material having peel-off portion which removed reveals an adhesive material, or in a releasably fastened manner described elsewhere in the present specification. In FIGS. 10A through 10C each of opposite outer sides of a VSRI display member 46 comprises an elongate tongue 128 (or rib) which is slidably operable within a respective elongate groove 130 (or channel) of an apparatus housing 94, e.g., wherein the elongate tongue or rib and groove or channel are each comprised of 90° or square cut corners. In FIGS. 11A through 11C each of opposite outer sides of a VSRI display member 46 comprises an elongate tongue 128 or rib slidably operable within a respective elongate groove 130 (or channel) of an exterior apparatus housing 94, wherein the tongue and groove are each comprised of mitered or angled cut corners.

More particularly, in each of FIGS. 10A and FIG. 11A a VSRI display member 46 has a displayable vehicle-operator facing surface 32 and vehicle safety-related indicia (VSRI) 14 thereon, and on an opposite rearward-facing surface portion a fastening means 58 suitable for mounting, or releasably, attaching the VSRI display member 46 to vehicle mounting-surface 132. Thus configured, an adjacent exterior or outer apparatus member 94 is manually positionable in a slidable manner in relation to a stationary VSRI display member 46 such that, when member 94 selectively positioned by a vehicle-operator to a fully-opened state, the vehicle safety-related indicia (VSRI) 14 on the vehicle-operator facing surface 32 is fully revealed.

In each of FIGS. 10B and FIG. 11B a converse arrangement is depicted, wherein one or more rear-surface portions of an exterior or outer apparatus member 94 is adapted to be mounted to or releasably fastenable to a vehicle windshield, dashboard or control panel in a stationary manner. Thus configured, an adjacent VSRI display member 46 or grip-end 18 thereof is manually positionable in a slidable manner in relation to the stationary exterior or outer apparatus member 94 such that, when selectively positioned by a vehicle-operator to a fully-opened state, the vehicle safety-related indicia (VSRI) 14 on the vehicle-operator facing surface 32 of member 46 is fully revealed.

Thus the 10A-10C and 11A-11C embodiments provide a pair of spaced apart walls of a cavity 44 opposing and parallel one another each having a channel or groove; and a pair of opposing and parallel sides of the VSRI display member each having a tongue or rib and cross-section thereof complementary to a respective channel or groove of the cavity walls. Thus configured, a normally vehicle surface-facing portion of a back side of the VSRI display apparatus, or a back side of the VSRI display member, is adapted to be releasably attached at, adjacent or proximate the vehicle surface located at least generally vehicle operator-facing, such that a back side and associated one of a VSRI display apparatus, or a VSRI display member, attached at, adjacent or proximate the vehicle surface, are stationary, and a back side and associated one of a VSRI display apparatus, or a VSRI display member, not attached at, adjacent or proximate the vehicle surface, are slidably positionable.

In reference to FIGS. 12A-12C each is a two-dimensional depiction of a VSRI display apparatus positionable member 12, wherein a normally front, vehicle-operator facing surface 32 of the member (e.g., when fully-revealed) comprises a receptacle, pocket or envelope 136 (hereinafter referred to as 'receptacle') having an upper opening suitable for receiving each of one or more insertable and removable cards, sheets or tiles e.g., as depicted in FIGS. 13A and 13B (hereinafter referred to as 'insertable VSRI'). Each insertable VSRI includes on at least one of its planar sides, a different type VSRI 14 indicating, representing, depicting, or associated with one or more objects (in a manner and/or of a type previously described) which, when selectively inserted into the receptacle 136 is viewable through a transparent or translucent vehicle-operator facing surface of the receptacle. To facilitate an inserting or removal of one or more insertable VSRI respectively into or out of a receptacle 136 a vehicle-operator facing side of the receptacle can include a cut-away contour 140 (e.g., as depicted in FIG. 12A).

A receptacle 136 can comprise a flexible and/or stretchable material, a rigid or resilient material, or can be integrally formed within or adjacent a display apparatus positionable member 12. The receptacle can be sized interiorly to accommodate one insertable VSRI at a time (e.g., displaying VSRI of a given side thereof), or sized to accommodate a plurality of insertable VSRI selectively inserted into the receptacle 136 in any order of a vehicle-operator's choosing. The interior of a receptacle 136 can comprise a single cavity (of one capacity or another) e.g., as depicted in the distal end view of FIG. 12C, or include a plurality of opposing inward-facing slots or channels, into each aligned pair of which a single insertable VSRI can selectively be inserted as depicted the top view of FIG. 12B.

In reference to the two-dimensional figures of 13A and 13B, FIG. 13A each depicts an option to include a plurality, series or array of insertable VSRI 14 rendered onto single contiguous sheet of foldable material, wherein each VSRI 14 is representative of, or depicts one or more objects of a type preferably commonly extending outwardly from a side of a vehicle. The foldable sheet material can be selectively folded by a vehicle-operator (for example as depicted FIG. 12C) such that any one of the VSRI 14 (138a, 138b, 138c, 138d, and so forth) is displayed adjacent the transparent or translucent side of the receptacle 136. Such foldable sheets can be sold as a complementary accessory in a retail type of commerce, and/or be made downloadable from website having retail products. As can the separate insertable VSRI 14 (138e, 138f, 138g, 138h, and so forth) depicted in FIG. 13B.

The two-dimensional view of 13B depicts an option to provide one or more, or a plurality, of separately insertable VSRI 14 rendered onto one or both sides individual cards, sheets or tiles. In which case, any one or more of separately insertable VSRI 14 (138e, 138f, 138g, 138h, and so forth) can selectively be inserted into a receptacle 136 to thereby represent an actual one or more objects currently, or about to be, extending outwardly from a vehicle in which a VSRI display apparatus 10 is installed.

Alternatively, or additionally, one or more VSRI cards, sheets or tiles, can comprise on one or both planar sides (or attachable thereto, or revealable thereon), one or more of, an adhesive material, or material have an adhering property, interfacing releasably fastenable snaps, hook-and-loop material, magnets, and the like, in which case, any of such can be employed to mount, or releasably fastened to a normally front, vehicle-operator facing surface of a VSRI display member 12, a VSRI card, sheet or tile which is then selectively revealable when slidably positioned to a fully-revealed state, by a vehicle-operator.

In reference to the two-dimensional depictions of FIGS. 14A though 15, each of the figures depicts a VSRI display apparatus 10 comprising a foldable material, and is similar to the preferred foldable-material embodiments of FIGS. 6A through 9D. FIGS. 14A and 14B are each a two-dimensional depiction of a VSRI display apparatus 10, wherein FIG. 14A is yet to be folded along fold-defining perforation or score line 78, and FIG. 14B (folded along 78) has a positionable VSRI display member 12 located slidably operable intermediate the two sides of the folded material. Display member 12, is operable to be selectively positioned, such that VSRI 14 thereon appears within an indicia content display window 190. FIG. 14A further depicts an option to include a displaying of a business card (and/or company logo) e.g., of a business entity engaged in sales and/or services of the one or more VSRI objects displayed by the VSRI display apparatus 10. The FIG. 14A-14B apparatus optionally or preferably has a widened tab 116 associated with, coupled to and/or extending outwardly from a lower side of a VSRI display member 12, which is insertable into and slidably operable within an elongate slot 118 by a vehicle-operator to selectively position the display member 12 between concealed and revealed states. FIG. 14A depicts an option to incorporate a displaying of a business card and/or company logo e.g., normally showing in display window 190 when the positionable member 12 is selectively slid to a concealed state. and which is covered by member 12 when the display member is selectively slid by a user to a revealed state (e.g. as depicted in FIG. 14B). It is noted that the depicted display window 190 can alternatively be a sleeve or envelope sized to retain a business card, having an opening along one side to receive an inserted card, and a window or transparent portion through which the contents of the card are made viewable.

12 FIGS. 14A and 14B further depict options to fold a full-width rear-side 122, or a half-width or lesser-width portion thereof, into layered folded portions of a VSRI display apparatus, wherein an employing of folded over full-width rear-side 112 option is used in rendering a VSRI display apparatus 10 as depicted in FIG. 14B. In an assembling of the VSRI display apparatus 10 and its VSRI display member as depicted in FIG. 14B, the rear-side 112 of FIG. 14A is folded along the fold-defining perforation or score line 78 e.g., such that rear-side 112 is aligned behind a vehicle-operator facing surface 32 of the apparatus (as depicted in FIG. 14B).

Alternatively, a half-width or lesser-width option employs material to the left of dashed-and-dotted cut line 194 such that the initial planar material (prior to folding) is 'L-shaped', wherein only the upper portion of the 'L' left of cut-line 194 is folded over. For example, in one mode, the upper 'L' portion is folded forward and over a left side portion of the full-width lower portion, thereby forming a left-side kind of 'pocket' e.g., giving a VSRI display apparatus 10 and kind of 'pocket-protector' like appearance (albeit horizontal in orientation). In such a case, the folded over (upper 'L') portion is preferably configured having an elongate horizontal slot and a VSRI display member 12 having at a lower end reduced-width adjustment tab slidably operable in the slot when the upper 'L' slot-equipped portion is folded over and fastened to the lower wider portion in a manner previously described. Preferably, the right-side portion of the lower full-width portion (to the right of the 'pocket' portion) includes an area within which a business card and/or company logo 184 can be incorporated, mounted or releasably fastened for display (as previously described) eliminating the need for cut-out indicia display window 190. Thereafter, in operation, the VSRI display member 12 is operable to be selectively slid by a manual control of vehicle-operator between a VSRI 14 fully revealed state, and a fully concealed state (e.g., in the latter case preferably, revealing the incorporated business card 184 or logo).

FIG. 15 is a two-dimensional depiction of another of the preferred embodiments of the present invention comprising, initially (prior to being folded), a planar taller-than-wide foldable material (not shown), wherein a folded over upper portion of the material, is aligned behind a vehicle-operator facing, surface 32 to form a reduced-width VSRI display apparatus 10 as depicted in FIG. 15. FIG. 15. further depicts an option to incorporate an enlarged-width elongated slot 182 wherein the width is sufficient to allow a positive contacting of an end of digit, over a 'finger-tip' movement range indicated by the double arrow headed line 192.

In operation, a fully revealed VSRI 14 of a VSRI display member 12 (depicted in FIG. 15) is selectively positionable by a vehicle-operator to a fully concealed state, by placing an end of a digit e.g., an end of an index finger in the right side of the enlarge slot, onto a lower left portion of member 12 e.g., optionally comprising a finger-tip indicator 188 (depicted in a dashed-line) and then, while applying some contact pressure, also imparting a lateral positioning of member 12, until the member is fully concealed. Optionally, a lower-left portion of the VSRI display member 12 can include one or more of: an aperture, a texturing, a raised ridge or rim, or the like, to facilitate positive lateral positionings of the member 12.

FIG. 15 also depicts an option to include a sleeve on a display member 12 surface for receiving and retaining one or more insertable VSRI 14, optionally including an upper cut-away portion 140 to facilitate an inserting and/or removal of insertable VSRI (as previously described).

FIG. 15 further depicts an option to eliminate the need for an enlarged slot 186 by instead extend downwardly adjacent a lower-left portion of a display member 12, an adjustment tab 114 e.g., slidably operable between a horizontal staple 98/stop on the right and a vertical staple 98 on the left. To predispose in either variant (slotted or tabbed) some added retention of a VSRI display member 12 at a fully-revealed state, or at a fully-concealed state, a staple fastened to an upper left portion of the member 12 is alignable during a selective lateral positioning into and out of engagement with an aperture catch or latch 68 e.g., in an upper right corner of the vehicle-operator facing surface 32 of the apparatus 10 and optionally also near an upper left corner.

Preferably each FIGS. 14A-14B and FIG. 15 VSRI display apparatus 10 includes a secondary indicia display area (dotted-line) 42 on a vehicle-operator facing surface 32 (e.g., in a manner previously described).

It is noted that indicia displayable on a vehicle-operator facing surface 32 of a VSRI display apparatus 10 or on a VSRI display member 12 can include 3D and or holographic content or subject matter.

In reference to FIGS. 16A-16B, 17A-17B and 19, each is a two-dimensional, somewhat diagrammatical depiction of a VSRI display apparatus 10 (or rear-side thereof) and an interior thereof, wherein each of the embodiments comprise a push-button release mechanism operable to automatically actuate a compressed-element release (as in FIGS. 16A-16B), or a tensioned-element release (as in FIGS. 17A-17B), wherein each release, configured to occur upon a pressing of button 150, is sufficient to laterally position a respective VSRI display member 12 (with VSRI 14 thereon) to a VSRI revealed state. A push-button release of a VSRI display member 12 in FIG. 19 allows a manual slide positioning of the member to a VSRI revealed state.

By way of example, in operation, a downward pressing (or pushing) of the button 150 can (in the present example) be translated at a lever pivot point 152 into an upward movement of latch element 154, which in turn is disengaged from the stepped portion 144, thereby releasing the display member 12 allowing an immediate expansion of the spring 156 as depicted (diagrammatically) in FIG. 16B, wherein the display member 12 is then retained at a fully-revealed state, preferably by some remaining spring pressure being applied to a distal end of the display member, which preferably urges each stepped portion 144 against a respective stop 142. A latch/release lever opened state 160 resulting from a downward pushing of button 150, is depicted in a dashed line in FIG. 16B. Optionally a small spring 166 can be employed to return the button to non-pressed position and enhance a latching of a fully concealed VSRI display member 12. To return the positionable display member 12 to a fully concealed state a vehicle-operator merely slides the member laterally to the left (e.g., somewhat firmly) and the latch element 154 once again instantly, re-engages the stepped portion 144.

With respect to FIGS. 17A and 17B, the aforementioned tensioned-element is comprised of an elastic material wherein a first portion thereof is associated (e.g. coupled) with at least one apparatus body portion 22 and at least one other portion thereof is associated (e.g., coupled) with a positionable VSRI display member 12, such that the elastic material is sufficiently stretched (tensioned) when a vehicle-operator manually slides the member 12 laterally to the left (e.g., somewhat firmly) until the latch element 154 once again engages the stepped portion 144 of the display member 12 in a fully-concealed state. For example, a lesser-stretched elastic loop 158a is depicted fitted about a plurality of short posts 164 (or fasteners), wherein two posts are depicted on an apparatus body 22 and one post proximate a distal portion of a display member 12 (as depicted in FIG. 17B). such that an urging of member 12 to a fully-concealed state results in the loop being stretched or tensioned from the size of the lesser-stretched elastic loop 158a of FIG. 17B to the size of a greater-stretched elastic loop 158b (as depicted in FIG. 17A), sufficiently stretched or tensioned to return the display 12 to a fully-revealed state upon a pressing of button 150.

Alternatively, a tensioned-element can comprise an elastic band or strap material stretchable between a lesser-stretched state and a greater-stretched state. For example, a lesser-stretched strap 158c depicted in top-views of FIGS. 17B and 17C and depicted in a side-view of FIG. 17D somewhat "J" shaped, partially changing directions about a roller 200. In the side-view of FIG. 17E the display member 12 is depicted slid to a fully closed position, having caused the strap to be stretched from a lesser-stretched strap 158*c* to a greater-stretched strap 158*d*.

Alternatively, a first strap or band lower portion depicted in FIGS. 17D and 17E can, instead of being an elastic material, comprise a spring (e.g. a coiled spring, not shown) attached on one end to a location on body 22 (similar to the attachment location for the strap 158*c* in FIG. 17B) and on its opposite end be attached to a shorter remainder portion of the strap, or other flexible member, such as a band, cord, wire, or the like, reversing direction about the roller 200. Thus configured, the spring will stretch and contract as a tensioned element in a very similar manner to that of the tensioning, and the released tensioning of the elastic member previously described.

Returning to the side-views of FIGS. 17D and 17E, each further depicts a partial side portion of a display member 12 (having the stepped portions 144), to an underside portion of which, a higher end of the strap (extending outwardly from the top of roller 200) is fastened. Thus configured, as the VSRI display member 12 is selectively being manually urged laterally toward a fully-concealed state, the stretched length of the lesser-stretched strap 158*c* (e.g., as in FIG. 17D) is concurrently being increased (further tensioned or stretched) until a stepped portion 144 of member 12 is again engaged or latched, at which point the greater-stretched strap 158*d* optimal length is reached (e.g., as in FIG. 17E), and maintained until a next push-button release occurs.

Preferably the loop and strap are each comprised of a durable elastic material (or material comprising elastic properties) wherein the material is of a type having a good or excellent stretch repeatability. For example, the loop or band material may consist of, or consist essentially of, or comprise, a polyurethane material, for example, being of a type which, following a pre-stretching procedure for optimizing stretch repeatability (prior to being incorporated into a VSRI display apparatus 10), is then employable in the apparatus as a tensioned-element for dozens to hundreds of use-cycles, wherein the elastic performance during each one of cycles is essentially the same.

In reference to another one of the preferred embodiments of the present invention illustrated in FIG. 18, a two-dimensional, somewhat diagrammatical representation of a rear-side of a VSRI display apparatus 10 is depicted, comprising, integrally formed therein, affixed or releasably fastened thereto, a solar panel 16S communicably coupled to a circuit, so as to cause a solar light charging of one or more rechargeable batteries 172, such that, when the apparatus is attached to an inside surface of a sloped windshield e.g., by a plurality of suction cups 146, one or more photo-voltaic cells of the solar panel face outward and somewhat upward so as to readily receive sunlight during daylight hours, and convert it into electricity suitable for storage in the battery(s) 172. Preferably a capacity of the photo-voltaic cells charge, and the one or more batteries store, a supply of electricity sufficient to power during at least hours of evening vehicle operation, one or more lights, electrically illuminated elements, or light-emitting-diodes 'LEDs', of a VSRI display member 12 illuminating embodiment of the apparatus e.g., as depicted in FIG. 19. Optionally the apparatus can include a light-intensity sensing element 176 communicably coupled to the circuit and one or more other components thereof e.g., adapted to turn on a charging of the battery(s) and/or the electrically illuminated elements) or LED(s) upon light outside a vehicle dropping below a given threshold (e.g., wherein an illuminating of the display would be helpful in seeing the display and/or further enhancing vehicle safety.

Additionally, one or more embodiments of the VSRI display apparatus 10 can further comprise a circuit in operative communication with a RFID reader, or transceiver, operable to sense and or read an RFID element, tag, or the like. For example, on or in one or more objects adjacent and extending outwardly from a side of a vehicle, or near a vehicle, or as the object is being moved into the vicinity of, or in close proximity to, a vehicle. For example, wherein in such applications, preferably RFID reader of a UHF type is incorporated into an VSRI display apparatus, e.g., to thereby have an RFID tag or element sensing range not limited to a one meter or less sensing range of non-UHF (lower frequency, near-field) RFID readers. Preferably an RFID tag or element sensed by a VSRI display apparatus incorporated RFID reader, comprises data programmed and/or associated with the RFID tag or element useful in identifying an object type, or one or more properties relating one or more objects, and/or a vehicle-side location to which an object incorporating RFID element or tag is associated. Preferably such data is communicable to a RF receiver component and/or processor of a VSRI display apparatus 10 circuit operable to wirelessly receive the data. Preferably one or more components in operative communication with the circuit are operable in response to receiving such data and/or upon a detecting or sensing of an RFID tag or element by the RF UHF reader to implement and/or control a VSRI display apparatus vehicle safety-related or safety-enhancing task or function. For example, including, but not limited to, one or more of the following: (a.) cause a lighting of one or more apparatus housing or body incorporated electrically illuminated elements or LEDs e.g., LEDs 180, such as a lighting of a revealed VSRI display member 12 having VSRI 14 thereon or an edge-lit lighting of a VSRI display member comprising a transparent or translucent plastic or glass material; (b.) actuate a solenoid or other linear actuator located interiorly within an apparatus housing or body (or cavity thereof) which in turn imparts a slide positioning to a VSRI display member e.g., to a fully-revealed state; or, imparts to a push-button 150 e.g., an underside portion there-of, a linear actuation sufficing to a momentarily uplift the button to cause an automatic release of a latch-retained VSRI display member 10 representing or depicting the one or more objects adjacent the vehicle side; (c.) implementing both "a." and "h." sequentially in either order, reverse order or concurrently; (d.) causing an electro-mechanical actuator or linear actuator in operative communication with the circuit, and an actuator control thereof which imparts to linkage mechanically associated with a portion of a VSRI display member 12 to slidably move the display member 12 to, or between, a fully-revealed state, a fully-concealed state, and/or doing so in accordance with when the RFID UHF reader is sensing and/or reading an RFID element or tag adjacent or proximately approaching a side of the vehicle; (e.) causing a displaying of a predetermined video, or image and/or alphanumeric content file stored communicatively coupled with the circuit e.g., associated with the vehicle side-adjacent (or approaching) one or more objects, or RFID tag or element data read by the RFID UHF reader, to be displayed on a planar pixelated display material located adjacent a VSRI display member 12; and the like.

Accordingly, in one example of various exemplary RFID enabled arrangement variants possible, a VSRI displaying apparatus is adapted to incorporate into an apparatus housing, an electrical circuit in operative communication with, at least, a supply of electricity; an ultra-high frequency (UHF) RFID reader, adapted to be powered by the supply of electricity. Wherein the RFID reader is operable—in response to reacting data of at least one RFID tag or element (compatible with a UHF RFID reader) and associated with and/or attached adjacent a respective at least one of one or more objects adjacent, proximate, or being brought into the vicinity of a vehicle in which the VSRI display apparatus is releasably attached,—to communicate one or more control signals via the circuit, comprising either or both: a control signal momentary switched-on state communicated to at least one electro-mechanical actuator positioned internally within the VSRI apparatus housing to impart a linear actuation of sufficient force to a side portion of a VSRI display member to slide the member to a VSRI revealed state; a control signal switched-on state communicated to at least one lighting element positioned internally within the VSRI apparatus housing to direct light onto at least one side of a revealed state VSRI display member.

While FIGS. 18 and 19 employ a 'circle' to diagrammatically depict one or more batteries, it is noted that one or more other arrangements for retaining one or more batteries including those having a different shape are also within the scope of the present invention including interior battery enclosures having a slidable or locking hatch or cover.

FIG. 19 is a two-dimensional, somewhat diagrammatical depiction of an interior of a display apparatus body 22 or an upper portion of a rear-side 112 thereof, and preferably comprising the solar panel 168 and related components of the preferred embodiment of the present invention depicted in FIG. 18, wherein FIG. 1.9 further depicts an option to include a self-illuminating embodiment of a VSRI display apparatus. Preferably, FIG. 19 also comprises a slidably positionable display member 12 e.g., of a type manually positionable, or of a type actuated upon a push button release to slidably position a display member 12 to a fully-revealed state by a spring under compression as in FIGS. 16A-16B, or by a tensioned loop or strap as in FIGS. 17A-17E. Preferably, the apparatus comprises a switch 174 e.g., with a slidable button under some spring tension, wherein the button is slid ('switched') to an 'OFF' state upon contact being applied by an inward-facing side 180 of the slidably positionable member 12, when the member is selectively positioned laterally to a fully-concealed state and a stepped side portion 144 thereof is latched in a manner previously described (e.g., by a latch mechanism 100, or latch element 154). Thereafter, upon an urging of a manually positionable display 12 laterally sufficient to overcome a latch mechanism 100 retention of a stepped portion 144, or by a push button releasing of a latch element 154 engaging a stepped portion 144. the inward-facing side 180 of the member 12 separates from the spring tensioned slidable switch button 174 which in turn, returns the switch to an 'ON' state.

Preferably the apparatus body 22 includes the light-intensity sensing element 176 previously described, which is communicably coupled to a circuit including the switch e.g., adapted to turn on one or more electrically illuminated elements, or LEDs. 170 when the positionable member is in a fully-concealed state and when light outside a vehicle, in which the apparatus is mounted or releasably fastened, is sensed to be below a given light threshold.

Optionally, a VSRI display member 12 can have a body comprising a transparent or translucent material e.g., a plastic or glass material, whereby light (depicted in dashed-and-dotted lines) emanating from the light(s), illuminated elements or LEDs 170 and penetrating the inward-facing side 180 of the member 12 illuminates vehicle safety-related indicia displayed thereon. The illuminating elements or LEDs provided in the apparatus body 22 can of a type providing a generally 'white' light or one or more colors.

It is noted that a surface texturing, engraving, etching, sand-blasting, embossing of VSRI on a display member 12, and/or a masking treatment, painting, silk-screening, or opaque material applied to one or more, or all, negative-spaces in and/or around such indicia, can be conducive to improving a discernible or viewable at-a-glance perception of the VSRI and/or aesthetic quality thereof, and any one or more of such, are employable in the FIG. 18 and/or FIG. 19 preferred embodiments. Additionally, or alternatively the use of one or more glow-in-the-dark materials for negative space(s) or outlines of VSRI on a display member 12 are also employable.

FIG. 20 is a three-dimensional depiction of an interior-facing portion of a dashboard, control or instrument panel 162 of a vehicle, comprising, a plurality of generally vehicle-operator facing portions 182 or air-vents 178 located therein (e.g., readily within reach of a vehicle operator), on, or to which, a rear side of a VSRI display apparatus 10 or display apparatus body 22 can be mounted, or releasably fastened, attached or clipped, unobtrusively, in a manner not impeding a view of the vehicle operator when normally looking forward, and such that a slidably positionable display member 12 and vehicle safety-related indicia 'VSRI' displayed thereon is selectively positionable by a vehicle-operator in a visually perceptible and/or viewable at-a-glance manner by the vehicle operator.

With respect to FIG. 21, a VSRI display apparatus 10 embodiment is depicted (releasably attachable in a manner previously described) interiorly comprising two magnets 202A and 202B aligned such that like poles are adjacent one another, wherein each magnet comprises sufficient magnetic force such that, upon a push-button 150 release of the VSRI display member 12 (as previously described), the display member incorporating a magnet 202A located on an inwardly-facing end, is repelled away from a magnet 202B located adjacent a cavity 44 side facing passageway 34, wherein the magnetic force suffices to slidably position the VSRI display member to an indicia fully-revealed state (e.g., in a manner similar to an indicia fully-revealed state depicted in FIGS. 16B, 17B and 19). A VSRI display member 12 thus repelled, is returned to an indicia concealed state e.g., by being manually urged inwardly into cavity 44 (as in FIG. 21) and re-engaged for a subsequent push-button 150 release. Similarly, an alternative magnetic linear actuating or repelling force sufficient to slide a VSRI display member to an VSRI displaying revealed state can be selectively employed, wherein a supply of electrical power communicatively coupled with a circuit incorporated into an apparatus housing 22 is activated or switched momentarily-on by a pushing of a housing accessible apparatus button, which in turn empowers, either: a) a linear actuating of an armature of a solenoid adapted at an end to in turn impart the linear actuating force sufficient to slide the VSRI display member 12; or, b) like poles of electro-magnetic 202A and 202B magnet variants adjacent one another to in turn impart the repelling force sufficient to slide the VSRI display member 12. Alternatively, or additionally the supply of electrical power communicatively coupled with a circuit incorporated into an apparatus housing 22 may be activated or switched momentarily-on by a RFID proximity sensing device of a VSRI display apparatus sensing a proximate RFID element or tag adjacent, nearby or approaching nearby a vehicle having the VSRI display apparatus e.g., wherein the RFID element or tag is located with one or more objects already adjacent a side of the vehicle, or being moved toward a side of the vehicle (as described in more detail below).

In reference to FIGS. 22A through 22E, a VSRI apparatus 10 embodiment is depicted (releasably attachable in a manner previously described) optionally having on at least one side of an apparatus housing 22 and/or VSRI display member 12 (e.g., a distal end) a non-square angled side 204. Additionally, or alternatively, other VSRI apparatus 10 and/or VSRI display member 12 shapes are also employable, including but not limited to, shapes having a pair of opposing parallel sides such as a parallelogram, a trapezoid, or certain polygonal shapes.

In FIGS. 22A, 22C and 22D VSRI display member 12 is depicted showing indicia indicative of a bicycle mounted vertically atop a rack 40 e.g., a bicycle extending outwardly and upwardly from a roof rack mounted adjacent a roof-side of the vehicle.

FIG. 22B depicts secondary indicia display area 42 (shown in dotted line) employable as previously described and which may additionally or alternatively include an aforementioned indicia pocket or receptacle.

In FIGS. 22A through 22D a front-side, vehicle-operator facing surface 32 shown proximate above a cavity 44 incorporating portion of the apparatus housing 22 is depicted having a reduced width, which may otherwise comprise a wider width such as in embodiments previously described e.g., to accommodate a larger front-side, vehicle-operator facing surface 32 and/or secondary indicia in a manner previously described. Preferably the embodiment depicted in FIGS. 22A through 22D comprises a VSRI display member support ledge 206 having a width and height surface in alignment with a elongate passageway 34 aligned with and leading into an elongate outwardly-facing open side of a cavity 44, such that an end portion back-side of a VSRI display member 12 aligned adjacent the support ledge 206 surface, facilitates an aligned guidance and support of an inwardly-facing end portion of display member 12 when manually being slidably positioned into passageway 34 and cavity 44 e.g., to be releasably attached therein.

In FIG. 22C, the housing 22 of VSRI apparatus 10 is shown having two cutaway views 210 each showing at an opposite end of an interior portion of cavity 44 a spring-clip retainer 212. The end portion of the VSRI display member 12 is depicted in FIG. 22C comprising opposing spring-clip engagement indents 214 each sized and shaped to be releasably attached within a respective spring-clip retainer 212 when the end portion of the VSRI display member 12 is urged inwardly fully into cavity 44. Accordingly, each of a plurality of VSRI display members 12 having different VSRI thereon are selectively insertable and removable from the FIG. 22C housing 22 of VSRI apparatus 10, and such additional VSRI members 12 can be sold with, or separately from, a given VSRI apparatus 10. While a particular combination of opposing spring-clip engagement indents 214 releasably attachable within respective opposing spring-clip retainers 212 have been described, it is noted that various other arrangements for slidably positioning a VSRI display member such that it is releasably attached to a VSRI display apparatus 10 are also employable. For example, FIG. 22E depicts adjacent an end portion of an VSRI display member 12 an arrangement of a plurality of retention flanges, tabs or hooks each insertable into a corresponding apparatus 10 receptacle or aperture adapted to positively receive any of such e.g., when manually urging the display member end inwardly then downwardly, wherein a subsequent removable of the display member 12 occurs conversely, by an urging of the display member end upwardly then outwardly. Alternatively, one or more tabs adjacent an end portion of the member 12 can be somewhat wedge-shaped wherein a tab distal end portion is narrower than a member-attached portion of the tab, which in turn is somewhat wider than a corresponding aperture width of the apparatus housing (or body) whereby each tab distal end can be selectively wedged into and removed from a corresponding aperture for an inserting and removal of a given VSRI display member.

In reference to FIGS. 22A-22E, various ways for positively inserting and releasably attaching an end of the VSRI display member 12 in or to the housing 22 are alternatively or additionally employable, including but not limited to one or more of: a VSRI display member 12 comprising one or more elongate transverse ribs or tongues e.g., slidably positionable into one, or opposing, transverse grooves of a housing 22 or conversely a VSRI display member 12 comprising one or more elongate transverse grooves and the housing having a like number elongate ribs; one or more pins, pegs, screws or keepers insertable or installable into apertures of a housing 22 portion alignable with a like numbered aperture(s) of an end portion of VSRI display member; an employing of an adhesive material adapted to releasably attach a VSRI display member to a housing 22; and the like. Magnets, snaps, clasps, hooks, hook-and-loop material, pegs, pins, loops and hooks, and/or one or more fasteners previously described are also employable.

FIG. 22C further depicts an option to include one or more electrically illuminated elements such as one or more LEDs e.g., in a manner previously described. For example, wherein a VSRI display member 12 comprising a transparent or translucent material such as a plastic or polymer material (e.g., acrylic), or glass, includes on a major side etched or engraved, laser-etched or laser-engraved (or otherwise rendered by suitable means thereon) VSRI which in turn is illuminated by light from the LED(s) directed into the transparent or translucent material e.g., providing an edge-lit illuminating of the VSRI, rendered on a given releasably attached VSRI display member 12. Accordingly such lighting is advantageous in low-light and/or poor-light conditions, and a previously described light-level or threshold sensing apparatus incorporated into an electrical circuit of a VSRI apparatus 10 can additionally be employed to automatically edge-light VSRI in response to a given or predetermined low-light and/or poor-light level or threshold being sensed.

It is noted that pocket or receptacle portion of a VSRI apparatus housing 22 can (e.g., in a manner previously described) be adapted to hold or store one or more additional VSRI display members 12 insertable in and removable from a pocket or receptacle opening accessible adjacent a side of the apparatus. See also FIGS. 12A through 12C.

In reference to FIGS. 23A and 23B, a VSRI display apparatus 10 is depicted comprising a slidably adjustable flexible VSRI display member 222, which in FIG. 23A is slidably retracted into a housing 22 of the apparatus (or body thereof), and in FIG. 23B is depicted having been slid by a manual positioning of a handle 230 attached to a distal end of the flexible display member, so as to extend the flexible material outwardly over an full adjustment range indicated by bracket 226. The VSRI display apparatus housing 22 preferably comprises a principally cylindrical shaped portion integrally formed adjacent, or adapted to be releasably attached adjacent, transversely a first housing end adjacent a vehicle-operator facing surface 32. Coaxially located within, and having a diameter less than that of, the cylindrical shaped portion, is a spindle or cylindrical roller (not shown) configured at opposite ends so as to rotate about a longitudinal axis. In one embodiment of the FIG. 23A-23B VSRI display apparatus 10 the spindle or cylindrical roller comprises a diameter of a greater reduced-size sufficient to accommodate a rolling up of the entire length of a suitably flexible display member 222 when retracted thereabout. In another embodiment of the display apparatus 10 (of FIGS. 23A and 23B) a spindle or cylindrical roller has a diameter of a lesser-reduced size, sufficient to accommodate a guiding of the flexible display member 222 between an generally outwardly-facing spindle or roller side and a proximate concave arced interior portion of the cylindrical shaped portion, such that the member (preferably configured somewhat stiffer than that of the prior embodiment) moves within a lower apparatus housing portion in a direction opposite that of the handle 230 being manually slidably positioned.

Additionally or alternatively, a normally vehicle-operator facing surface area of the flexible VSRI display member 222, visually perceptible to a vehicle operator when the apparatus 10 is mounted for use and the flexible member is extended fully outward, can further comprise a flexible transparent pocket or receptacle located adjacent a side portion of the flexible VSRI display member, the flexible pocket or receptacle of sufficient capacity to receive inserted therein and extract removably therefrom one or more of a plurality, series or array, of different flexible VSRI elements, each independently displayable as VSRI of the flexible VSRI display member.

Thus, configured one or more different pocket-sized VSRI can be selectively inserted or removed from the flexible transparent pocket wherein both the flexible pocket and the flexible display member 222 are retractable or slidably positionable into a VSRI non-revealed state within the housing 22 of the apparatus 10, and thereafter ready for a subsequent positioning to a VSRI revealed and releasably attached state.

In operation, a vehicle operator or user of a FIG. 23A embodiment can begin a manual positioning of the handle 230 (or other member attached to a distal end of a flexible display member 222) at an apparatus 10 location similar to that depicted in FIG. 23A, such that a VSRI display member distal end and flexible display material attached thereto slides outwardly until a flexible VSRI display member fastener 228 located adjacent the distal end of the flexible member is aligned to engage with a corresponding fastener receiver and/or suitable fastener attachment point or element. For example, in FIG. 23C a distal end 24 of the VSRI display apparatus 10 embodiment depicted in FIGS. 23A and 23B, comprises an apparatus housing elongate slot for engagement of an elongate hooked portion of a flexible VSRI display member fastener. In FIG. 23D the elongate hooked portion of a flexible VSRI display member fastener 228 in depicted engaged within the elongate slot 232. it is noted that various other arrangements for releasably fastening It is noted that an end portion of an aforementioned spindle or roller can be adapted so as to predispose either, to retract, or facilitate a retraction of, a flexible VSRI display member. For example, by further comprising an elastic material or combination spring-and-strap, attached intermediate a housing interior portion at one end and proximate a handle 230 at an opposite end, wherein the elastic material, or the strap portion of the spring-ad-strap combination is directed about an outwardly facing side of a roller, in a previously described manner, such as that described in reference to FIGS. 17C, 17D and 17E. Thus configured, a roller, such as roller 200 (or narrower variant thereof), may be incorporated adjacent and aligned coaxially with the flexible VSRI display member roller or spindle, such that the elastic material (e.g., a pre-stretched polyurethane narrow strap or band), or the spring of the spring-and-strap combination, is stretched upon a manual slide positioning of the handle 230 outwardly toward distal end 204 (e.g., akin to a manual positioning of handle 12 in FIGS. 17D and 17E). Subsequent to a fastener of a handle 230 being engaged e.g., in an elongate slot 232, and upon a vehicle operator or user disengaging the handle fastener a tensioning of the spring or elastic material suffices to fully retract the flexible VSRI display material 222 interiorly within the apparatus housing 22 or facilitates such a retraction.

Additionally, one or more variants of the embodiment depicted in FIGS. 23A through 23D can comprise, as previously described, an electrical circuit in operative communication with a supply of electricity, an electrical switch and at least one lighting element wherein, a lighting element is positioned within the housing of the apparatus to direct light, in response to a manual switching on, or alternatively an electronic switching on, of the switch, onto a vehicle-operator facing surface 32 made of a transparent or translucent material, wherein the light is of sufficient intensity to backlight a flexible VSRI display material 222 sildably positioned in close proximately above surface 32 which preferably is made of a material conducive to being thus backlit. For example, wherein a lighting of the flexible VSRI display member 222 is of sufficient light intensity to be visually perceptible at-a-glance to the vehicle operator, repeatedly, in a low-light or poor-light condition about the vehicle operator.

It is noted that one or more of a number of various fasteners including, but not limited to those previously described, are employable to releasably attach a distal end of flexible VSRI display material to a distal end of an VSRI display apparatus housing portion. A VSRI display apparatus 10 and/or VSRI display member 12 may further or alternatively comprise a normally vehicle-operator facing surface, or subset portion thereof, having or incorporating an opaque, translucent or transparent material suitable for marking with a pen or marker having an erasable or whiteboard erasable ink or dry ink, whereby, a vehicle operator may hand-write information such as VSRI information, or other notation(s) thereon e.g., applicable to a particular one or more destination(s), object(s) adjacent at least one side of the vehicle, task(s) to be done, item(s) to procure, and the like, during a given route, leg, trip or journey. Similarly, the normally vehicle-operator facing surface, or subset portion thereof, can comprise a material or surface material (or portion thereof) suitable for attaching adjacent thereto, a paper note sized smaller than or approximately the same size as the vehicle-operator facing surface, or subset portion thereof, for example, by a clip (or other suitable fastener), or by a paper note having on a back side an adhesive portion.

Although the present invention has been described with a certain degree of particularity, it is understood that the present disclosure has been made by way of example, and changes in detail or structure may be made without departing from the spirit of the invention in the previous descriptions and those skilled in the art should understand that they can make various changes, substitutions and alterations herein without departing from the spirit and scope of the invention in its broadest form.

What is claimed is:

1. An apparatus for displaying a presence of an external vehicle attachment to a vehicle that is visible to an operator of the vehicle, comprising:

a housing having a front side and a back side;

a releasable mount on the back side of the housing to allow the housing to be removably attached to the inner surface of a windshield or a visor;

an image of the vehicle disposed on the front side of the housing; and at least one vehicle-operation safety-related indicia (VRSI) including an image wherein the VRSI is moveably attached to the housing to allow the VRSI to move from a displayed position to a hidden position wherein the VRSI image includes an item that has been attached to an external surface of the vehicle and wherein the VRSI displays the image of the item with respect to the image of the vehicle that corresponds to the position of the item as it is attached to the external surface of the vehicle when the VRSI is in the displayed position.

2. The apparatus in claim 1, wherein the VRSI image is a bicycle.

3. The apparatus in claim 1, wherein the VRSI image is a trailer.

4. The apparatus in claim 1, wherein the VRSI image is sporting equipment.

5. The apparatus in claim 1, where the VRSI is slidably attached to the housing.

6. The apparatus in claim 1, wherein the VRSI is rotatably attached to the housing.

7. The apparatus in claim 1, further comprising a light attached to the housing to illuminate the VRSI.

8. The apparatus in claim 1, further comprising a spring coupled to the housing and the VRSI.

9. The apparatus in claim 1, wherein the housing includes a pocket for storing at least at second VRSI.

10. The apparatus in claim 1, wherein an advertisement is displayed when the VRSI is in a hidden position.

* * * * *